US012592525B2

(12) United States Patent
Liu et al.

(10) Patent No.: US 12,592,525 B2
(45) Date of Patent: Mar. 31, 2026

(54) HIGH SPEED ELECTRICAL CONNECTOR

(71) Applicant: Amphenol Commercial Products (Chengdu) Co., Ltd., Chengdu (CN)

(72) Inventors: Yunxiang Liu, Chengdu (CN); Lei Liao, Shenzhen (CN); Luyun Yi, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 620 days.

(21) Appl. No.: 17/968,142

(22) Filed: Oct. 18, 2022

(65) Prior Publication Data

US 2023/0132094 A1 Apr. 27, 2023

(30) Foreign Application Priority Data

Oct. 21, 2021 (CN) ......................... 202111225828.3
Oct. 21, 2021 (CN) ......................... 202122536252.4

(51) Int. Cl.
*H01R 13/6597* (2011.01)
*H01R 12/71* (2011.01)
(Continued)

(52) U.S. Cl.
CPC ....... *H01R 13/6597* (2013.01); *H01R 12/716* (2013.01); *H01R 13/646* (2013.01);
(Continued)

(58) Field of Classification Search
CPC ......................... H01R 13/6597; H01R 12/716; H01R 13/646; H01R 13/6471; H01R 13/6581;
(Continued)

(56) References Cited

U.S. PATENT DOCUMENTS 6,872,085 B1 3/2005 Cohen et al.
8,083,553 B2 12/2011 Manter et al.
(Continued)

FOREIGN PATENT DOCUMENTS

CN 1299524 A 6/2001
CN 101124697 A 2/2008
(Continued)

OTHER PUBLICATIONS

Chinese Office Action dated Jan. 2, 2020 in connection with Chinese Application No. 201780064531.9.
(Continued)

*Primary Examiner* — Justin M Kratt
(74) *Attorney, Agent, or Firm* — Wolf, Greenfield & Sacks, P.C.

(57) ABSTRACT

A connector for use with high-speed signals. The connector includes conductors held in a housing having a slot for receiving a mating component. Each conductor has a mating end curving into the slot and a mounting end extending out of the housing. The connector has a conductive shell at least partially enclosing the housing. The conductive shell covers one or more sides of the slot and substantially overlaps the mounting ends viewing from a top of the mounting interface to provide shielding to the mating and mounting interfaces. The conductive shell is coupled to ground through ground conductors of the connector. The connector has a lossy member disposed adjacent the mounting interface and coupled to the ground conductors. Such a configuration meets signal integrity requirements in connectors designed for 32 Gbps and beyond, while conforming to a standard that constrains mating and mounting interfaces.

20 Claims, 18 Drawing Sheets

(51) Int. Cl.

| | |
|---|---|
| ***H01R 13/646*** | (2011.01) |
| ***H01R 13/6471*** | (2011.01) |
| ***H01R 13/6581*** | (2011.01) |
| ***H01R 13/6594*** | (2011.01) |
| *H01R 13/629* | (2006.01) |
| *H01R 13/6461* | (2011.01) |
| *H01R 13/6463* | (2011.01) |
| *H01R 13/648* | (2006.01) |
| *H01R 13/658* | (2011.01) |
| *H01R 13/6591* | (2011.01) |

(52) U.S. Cl.
CPC ..... *H01R 13/6471* (2013.01); *H01R 13/6581* (2013.01); *H01R 13/6594* (2013.01); *H01R 12/71* (2013.01); *H01R 12/712* (2013.01); *H01R 12/714* (2013.01); *H01R 13/629* (2013.01); *H01R 13/6461* (2013.01); *H01R 13/6463* (2013.01); *H01R 13/648* (2013.01); *H01R 13/658* (2013.01); *H01R 13/6591* (2013.01)

(58) Field of Classification Search
CPC .. H01R 13/6594; H01R 12/71; H01R 12/712; H01R 12/714; H01R 13/629; H01R 13/6461; H01R 13/6463; H01R 13/648; H01R 13/658; H01R 13/6591
See application file for complete search history.

(56) References Cited

U.S. PATENT DOCUMENTS

| | | | |
|---|---|---|---|
| 9,461,378 | B1 | 10/2016 | Chen |
| 10,243,304 | B2 | 3/2019 | Kirk et al. |
| 10,511,128 | B2 | 12/2019 | Kirk et al. |
| 10,916,894 | B2 | 2/2021 | Kirk et al. |
| 10,931,050 | B2 | 2/2021 | Cohen |
| 11,539,171 | B2 | 12/2022 | Kirk et al. |
| 2006/0068640 | A1 | 3/2006 | Gailus |
| 2011/0256739 | A1 | 10/2011 | Toshiyuki et al. |
| 2012/0115371 | A1 | 5/2012 | Chuang et al. |
| 2012/0184154 | A1 | 7/2012 | Frank et al. |
| 2012/0202363 | A1 | 8/2012 | McNamara et al. |
| 2012/0202387 | A1 | 8/2012 | McNamara |
| 2013/0288513 | A1 | 10/2013 | Masubuchi et al. |
| 2013/0316590 | A1 | 11/2013 | Hon |
| 2013/0340251 | A1 | 12/2013 | Regnier et al. |
| 2015/0111427 | A1 | 4/2015 | Wu et al. |
| 2015/0380868 | A1 | 12/2015 | Chen et al. |
| 2016/0000616 | A1 | 1/2016 | Lavoie |
| 2016/0156133 | A1 | 6/2016 | Masubuchi et al. |
| 2016/0172794 | A1 | 6/2016 | Sparrowhawk et al. |
| 2018/0062323 | A1 | 3/2018 | Kirk et al. |
| 2019/0221973 | A1 | 7/2019 | Kirk et al. |
| 2020/0235529 | A1 | 7/2020 | Kirk et al. |
| 2021/0159643 | A1 | 5/2021 | Kirk et al. |
| 2021/0175664 | A1* | 6/2021 | Cheng .................... H01R 13/05 |
| 2021/0313721 | A1* | 10/2021 | Little ................. H01R 13/6272 |
| 2022/0006242 | A1* | 1/2022 | Zhao .................. H01R 13/6471 |

FOREIGN PATENT DOCUMENTS

| | | | |
|---|---|---|---|
| CN | 101964463 | A | 2/2011 |
| CN | 102195173 | A | 9/2011 |
| CN | 102232259 | A | 11/2011 |
| CN | 102292881 | A | 12/2011 |
| CN | 102570100 | A | 7/2012 |
| CN | 202695788 | U | 1/2013 |
| CN | 202695861 | U | 1/2013 |
| CN | 103036081 | A | 4/2013 |
| CN | 103594871 | A | 2/2014 |
| CN | 204190038 | U | 3/2015 |
| CN | 104577577 | A | 4/2015 |
| CN | 205212085 | U | 5/2016 |
| CN | 102820589 | B | 8/2016 |
| CN | 109994892 | A | 7/2019 |
| EP | 2262061 | A1 | 12/2010 |
| JP | 2006-344524 | A | 12/2006 |
| TW | M403141 | U | 5/2011 |
| TW | M494411 | U | 1/2015 |
| TW | I475770 | B | 3/2015 |
| TW | M518837 | U | 3/2016 |
| WO | WO 2016/008473 | A1 | 1/2016 |

OTHER PUBLICATIONS

Chinese Office Action dated Apr. 2, 2021 in connection with Chinese Application No. 202010467444.1.
Chinese Office Action dated Aug. 6, 2021 in connection with Chinese Application No. 202010922401.8.
International Search Report and Written Opinion mailed Dec. 4, 2017 in connection with International Application No. PCT/US2017/047905.
International Preliminary Report on Patentability mailed Mar. 7, 2019 in connection with International Application No. PCT/US2017/047905.
Taiwanese Office Action dated Mar. 5, 2021 in connection with Taiwanese Application No. 106128439.
Taiwanese Office Action dated Mar. 15, 2022 in connection with Taiwanese Application No. 110140608.
Kirk et al., Connector Configurable for High Performance, U.S. Appl. No. 18/085,093, filed Dec. 20, 2022.
U.S. Appl. No. 18/085,093, filed Dec. 20, 2022, Kirk et al.
CN 202010467444.1, Apr. 2, 2021, Chinese Office Action.
CN 20201092201.8, Aug. 6, 2021, Chinese Office Action.
PCT/US2017/047905, Dec. 4, 2017, International Search Repor and Written Opinion.
PCT/US2017/047905, Mar. 7, 2019, International Preliminary Report on Patentability.
TW 106128439, Mar. 5, 2021, Taiwanese Office Action.
TW 110140608, Mar. 15, 2022, Taiwanese Office Action.

* cited by examiner

500

610

HIGH SPEED ELECTRICAL CONNECTOR

RELATED APPLICATIONS

This application claims priority to and the benefit of Chinese Patent Application Serial Nos. 202122536252.4 and 202111225828.3, both filed on Oct. 21, 2021, both entitled "ELECTRICAL CONNECTOR." The contents of these applications are incorporated herein by reference in their entirety.

FIELD

This patent application relates generally to interconnection systems, such as those including electrical connectors, used to interconnect electronic assemblies.

BACKGROUND

Electrical connectors are used in many electronic systems. It is generally easier and more cost effective to manufacture a system as several printed circuit boards (PCB) which may be joined together with electrical connectors than to manufacture the system as a single assembly. A known arrangement for joining several PCBs is usually to have one PCB as a backplane. Then, other PCBs, called "daughterboards" or "daughtercards", may be connected through the backplane.

A known backplane is a PCB onto which many connectors may be mounted. Conducting traces in the backplane may be electrically connected to signal conductors in the connectors so that signals may be routed between the connectors. Signals may be routed among daughtercards through the connectors and the backplane. For example, daughtercards may also have connectors mounted thereon. The connectors mounted on a daughtercard may be plugged into the connectors mounted on the backplane.

Connectors may be used in other system configurations, including in configurations in which an edge of a daughtercard is inserted in and mated directly to a connector. Connectors that mate directly to an edge of a daughtercard are referred to as card edge connectors. Card edge connectors are used inside electronic devices, such as PCs and servers. The electronic device may include a motherboard to which a processor is connected. Card edge connectors may be mounted on the motherboard and daughtercards, implementing peripherals, may be coupled to the processor on the motherboard through those card edge connectors. To facilitate assembly of electronic system in which peripherals are connected to a processor on a motherboard, standards have been developed for the interface between the peripheral and the motherboard. One such standard is the peripheral component interconnect standard, which has a version referred to as PCIe.

Electrical connector designs have been adapted to mirror trends in the electronic industry. Electronic systems have generally become smaller, faster and more complex in functions. These changes mean that the number of circuits in a given area of an electronic system, along with the operation frequencies at which the circuits operate have been increased significantly in recent years. Current systems pass more data between the printed circuit boards and require electrical connectors which can electrically process more data at a higher speed than the electrical connectors of even a few years ago. Accordingly, the standards defining interfaces through which that data passes may be updated from time. The PCIe standard, for example, has gone through various generations, referred to, for example, as PCIe M.2 Gen 3 or PCIe M.2 Gen 4 or PCIe M.2 Gen 5.

BRIEF SUMMARY

Aspects of the present disclosure relate to high speed electrical connectors.

Some embodiments relate to an electrical connector. The electrical connector may include a housing comprising a slot; a plurality of conductive elements aligned in a row direction, each of the plurality of conductive elements comprising a mating end, a mounting end, and an intermediate portion joining the mating end and the mounting end, wherein the mating end comprises a mating contact portion curving into the slot of the housing, the mounting end comprises a mounting contact portion extending out of the housing, and the plurality of conductive elements comprises signal conductors and ground conductors; and a conductive shell at least partially enclosing the housing and exposing the slot, wherein the conductive shell is coupled to the ground conductors.

Optionally, the conductive shell may contact the ground conductors at respective intermediate portions and/or mounting ends.

Optionally, the conductive shell may comprise a plurality of members aligned in the row direction, and each of the plurality of members may comprise a contact portion curving towards a respective ground conductor.

Optionally, the housing may comprise a top, bottom, front, rear, and two sides, the front of the housing may comprise an entrance to the slot, the bottom of the housing may comprise a mounting surface, and the conductive shell may at least partially cover the top, rear and two sides of the housing.

Optionally, the rear of the housing may comprise openings exposing portions of the signal conductors, and the conductive shell may be spaced from the exposed portions of the signal conductors by a distance in a range of 0.2 mm to 0.5 mm.

Optionally, the conductive shell may comprise members extending from the sides to the bottom, and the members may have surfaces configured for engaging contact pads of a printed circuit board to which the electrical connector is mounted.

Some embodiments relate to the system. The system may include an electrical connector described herein; and a printed circuit board, wherein the members of the conductive shell of the electrical connector may be soldered to contact pads of the printed circuit board.

Optionally, the housing may comprise a top, bottom, front, rear, and two sides, the front of the housing may comprise an entrance to the slot, the rear of the housing may comprise a mounting surface, and the conductive shell may at least partially cover the top, bottom, and two sides of the housing.

Optionally, the electrical connector may include a lossy member held in the housing and disposed adjacent a mounting surface of the housing, the lossy member comprising protrusions contacting respective ground conductors.

Optionally, the electrical connector may be configured to conform to electrical and mechanical requirements set by a PCIe Gen 5 standard.

Some embodiments relate to an electrical connector. The electrical connector may include a housing comprising a mating surface exposing a slot and a mounting surface opposite the mating surface; a plurality of conductive elements held in the housing, each of the plurality of conductive elements comprising a mating end, a mounting end, and an intermediate portion joining the mating end and the mounting end, wherein the mating end may comprise a mating contact portion curving into the slot of the housing, the mounting end may comprise a mounting contact portion extending out of the housing, and the plurality of conductive elements may comprise signal conductors and ground conductors; and a conductive shell covering one or more sides of the housing, wherein the conductive shell may be coupled to the ground conductors.

Optionally, for each of the ground conductors, the intermediate portion may comprise a projection towards the conductive shell.

Optionally, the conductive shell may comprise a plurality of members each curving towards the projection of the intermediate portion of a respective ground conductor.

Optionally, the conductive shell may comprise a plurality of holes, and the projections of the intermediate portions of the ground conductors may extend through respective holes of the conductive shell.

Optionally, the electrical connector may include a lossy member held in the housing and disposed adjacent the mounting surface of the housing, wherein, for each of the ground conductors, the intermediate portion may comprise a projection towards the lossy member.

Optionally, for each of the plurality of conductive elements, the mating end and the mounting end may extend in parallel or perpendicular to each other.

Some embodiments relate to an electrical connector. The electrical connector may include a housing comprising a mating surface exposing a slot and a mounting surface; a plurality of conductive elements aligned in a row direction, each of the plurality of conductive elements comprising a mating end having a mating contact portion curving into the slot of the housing, a mounting end comprising a mounting contact portion extending out of the mounting surface of the housing, and an intermediate portion joining the mating end and the mounting end; and a conductive shell extending from the mating surface to the mounting surface, wherein a subset of the plurality of conductive elements are coupled to the conductive shell.

Optionally, the conductive shell may contact the subset of the plurality of conductive elements at respective intermediate portions and/or mounting end.

Optionally, the conductive shell may comprise a plurality of members each having a contact portion contacting a respective one of the subset of the plurality of conductive elements.

Optionally, for each of the subset of the plurality of conductive elements, the intermediate portion may comprise a projection contacting the conductive shell.

Optionally, the electrical connector may include a lossy member held in the housing and disposed adjacent the mounting surface of the housing, wherein the lossy member may comprise protrusions contacting respective ones of the subset of the plurality of conductive elements.

Optionally, the conductive shell may comprise tabs extending in parallel to the mounting surface such that the tabs are configured for surface mount soldering.

Some embodiments relate to an electrical connector. The electrical connector may comprise an insulating housing having a mating surface and a mounting surface, a plurality of conductors provided in the insulating housing and a conductive shell covering at least part of the insulating housing and coupled to the plurality of ground conductors. Each of the plurality of conductors may comprise an intermediate portion, a mounting end extending from the intermediate portion to the outside of the mounting surface and a mating end extending from the intermediate portion to the mating surface, the mounting end may be configured to be in an electrical connection with a printed circuit board when the electrical connector is attached to the printed circuit board, and the plurality of conductors may comprise a plurality of signal conductors and a plurality of ground conductors interspersed among the plurality of signal conductors.

Optionally, the plurality of conductors may be exposed by the insulating housing and covered by the conductive shell, and the conductive shell may be coupled to the exposed portions of the plurality of ground conductors.

Optionally, the conductive shell may be in electrical contact with the plurality of ground conductors through a plurality of contact members, respectively.

Optionally, the plurality of contact members may extend from the conductive shell to the interior of the conductive shell, and each of the plurality of ground conductors may be in electrical contact with a corresponding contact member.

Optionally, a projection may be provided on each of the plurality of ground conductors, extend beyond the insulating housing and abut against a corresponding contact member.

Optionally, a projection may be provided on each of the plurality of ground conductors and extend beyond the insulating housing, the conductive shell may be configured to be installed on the insulating housing from above, and each of the plurality of contact members may abut against a top surface of the projection on the corresponding ground conductor and a side surface of the corresponding ground conductor opposite to the plurality of contact members.

Optionally, each of the plurality of contact members may comprise a first inclined section extending obliquely from the conductive shell to a corresponding ground conductor and a second inclined section extending obliquely from the first inclined section away from the corresponding ground conductor, a contact portion may be formed at a joint of each first inclined section and the corresponding second inclined section, and each contact portion may be in electrical contact with the corresponding ground conductor.

Optionally, each of the plurality of contact members and the corresponding ground conductor may be in a plane parallel to the plurality of signal conductors.

Optionally, each of the plurality of contact members may extend from the corresponding ground conductor to the conductive shell, and may be in electrical contact with the conductive shell.

Optionally, a plurality of through holes corresponding to the plurality of contact members may be provided on the conductive shell, and each of the plurality of contact members may be inserted into the corresponding through hole to be in electrical contact with the conductive shell.

Optionally, a tab may be provided on the conductive shell, and the conductive shell may be fixed on the insulating housing by the tab.

Optionally, there may be a plurality of the tabs, and one or more of the plurality of tabs may be configured as one or more ground pads for being soldered to the printed circuit board.

Optionally, a connecting part may be provided on the conductive shell and used for connecting to the printed circuit board to enable the electrical connector to be attached to the printed circuit board.

Optionally, the connecting part may be a soldering tab.

Optionally, the soldering tab may be configured as a ground pad for being soldered to the printed circuit board.

Optionally, the electrical connector may further comprise a lossy member which may be provided on the insulating housing and coupled to the plurality of ground conductors.

Optionally, the conductive shell and the lossy member may be coupled to the plurality of ground conductors on the two sides of the plurality of conductors respectively.

Optionally, the lossy member may be positioned adjacent to the mounting surface.

Optionally, the lossy member may have a plurality of first protrusions which may be coupled to the plurality of ground conductors respectively.

Optionally, a groove may be formed in each of the plurality of first protrusions, each of the plurality of ground conductors may have a ground claw extending outwards, and the groove may receive the ground claw of the corresponding ground conductor.

Optionally, the lossy member may further have a plurality of second protrusions corresponding to the plurality of signal conductors, the plurality of second protrusions may have a same structure as the plurality of first protrusions, and each of the plurality of signal conductors may be spaced apart from the corresponding second protrusion.

Optionally, ground claw accommodating grooves mated to the ground claws may be formed in the insulating housing, the ground claws may be inserted into the ground claw accommodating grooves to hold the ground conductors on the insulating housing, an accommodation space may be further formed in the insulating housing, the lossy member may be accommodated in the accommodation space, and the accommodation space may communicate with the ground claw accommodating grooves.

Optionally, each of the plurality of signal conductors may have a signal claw extending outwards, an extension direction of the signal claw may be consistent with that of the ground claws, a signal claw accommodating groove mated to the signal claw may be further formed in the insulating housing, each signal claw may be inserted into the corresponding signal claw accommodating groove to hold the corresponding signal conductor on the insulating housing, a distance between each ground claw accommodating groove and the mounting surface may be less than a distance between each signal claw accommodating groove and the mounting surface, and the accommodation space may be positioned between the mounting surface and the signal claw accommodating grooves.

Optionally, the lossy member may not overlap broad sides of the plurality of signal conductors when viewed in an arrangement direction of the plurality of conductors.

Optionally, a minimum distance between the conductive shell and the plurality of signal conductors may be in a range of 0.2 mm to 0.5 mm.

Optionally, the electrical connector may comprise one or more of a right angle connector, a vertical mount connector and a straddle mount connector.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, identical or nearly identical components that are illustrated in various figures may be represented by a like numeral. For purposes of clarity, not every component may be labeled in every drawing. In the drawings.

DETAILED DESCRIPTION

Figure 1:
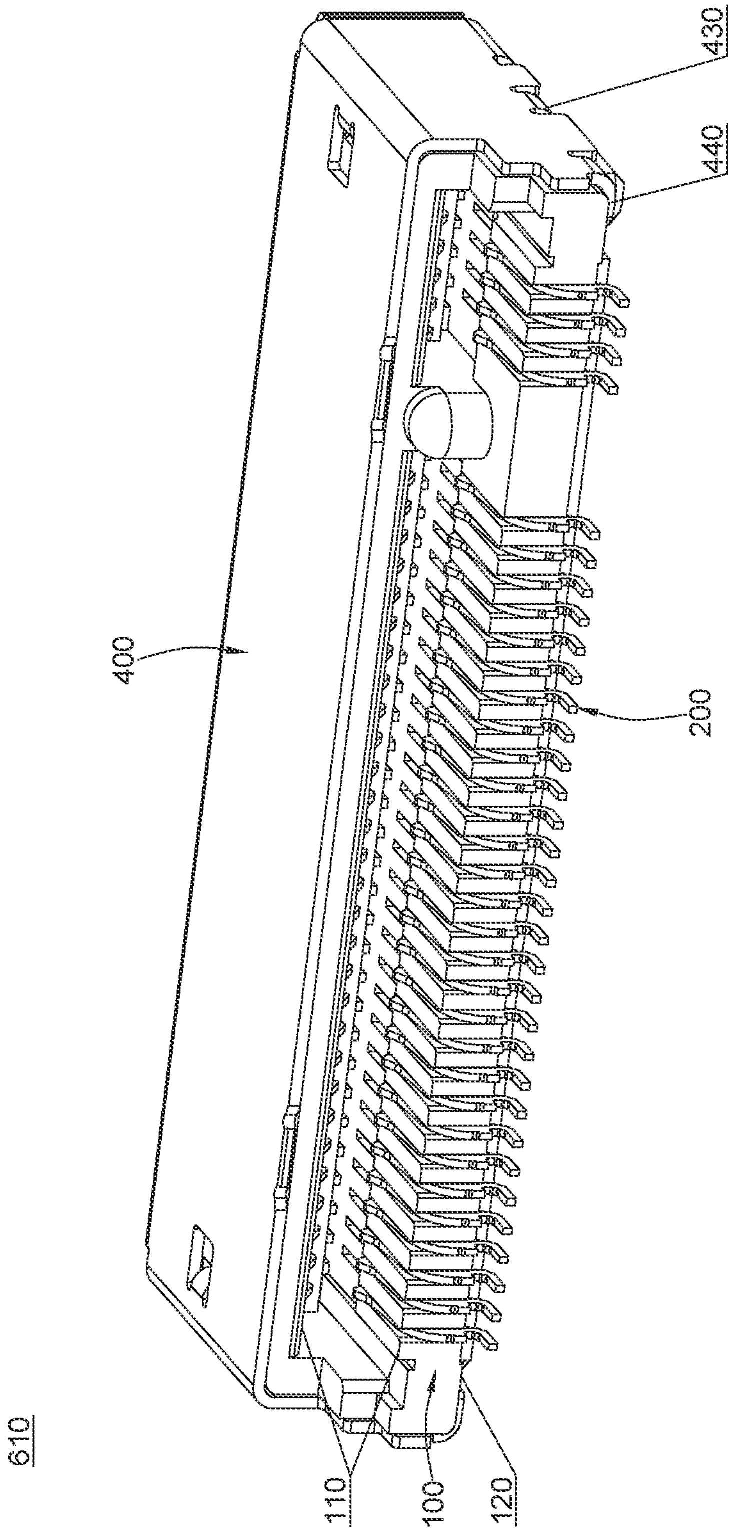
FIG. 1 is a top, front perspective view of a right angle connector according to some embodiments.
Figure 2:
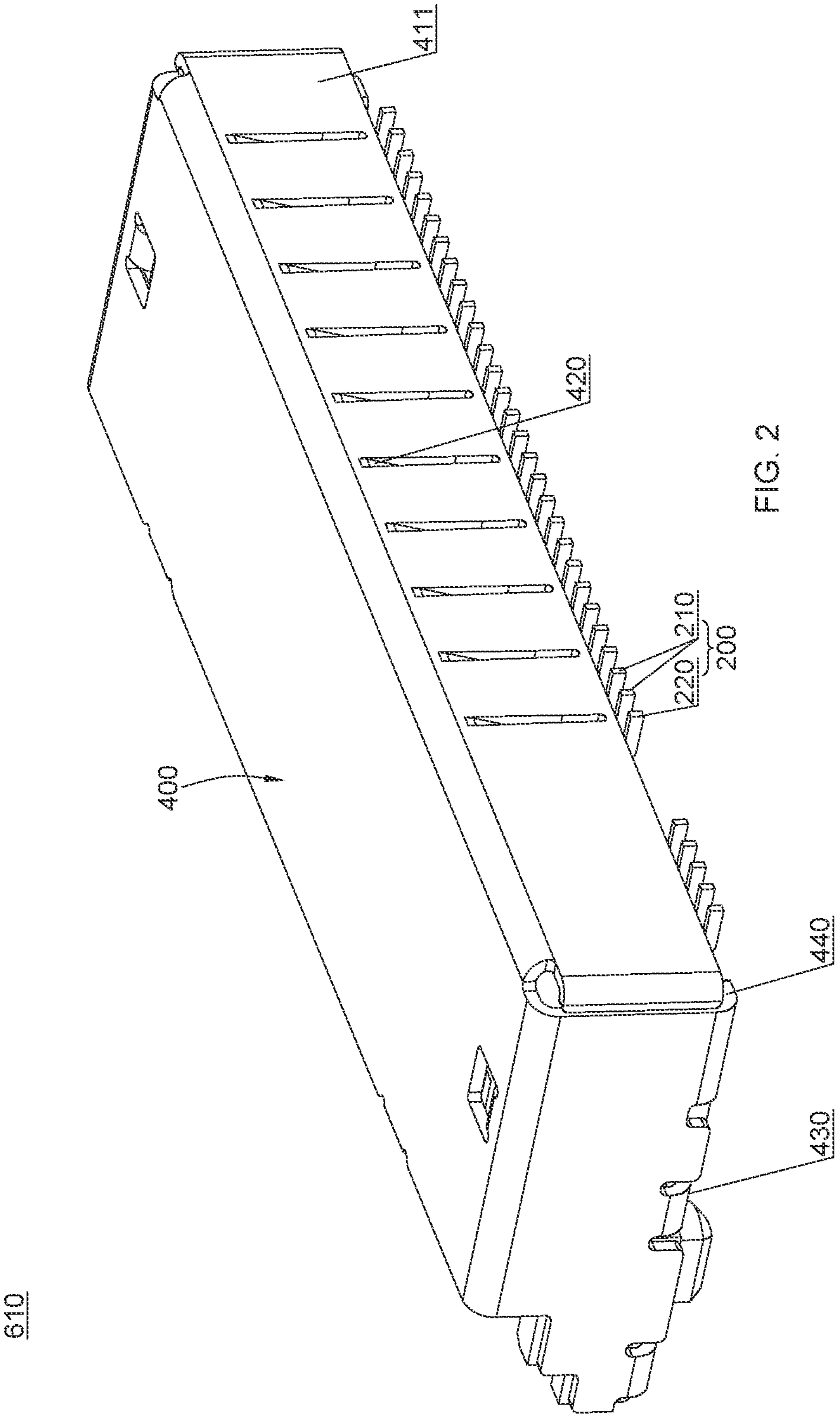
FIG. 2 is a top, rear perspective view of the right angle connector of FIG. 1.

The Inventors have recognized and appreciated connector design techniques that satisfy electrical and mechanical requirements to support greater bandwidth through high frequency operation. Some of these techniques may synergistically support higher frequency connector operation and satisfy the physical requirements set by industry standards such as PCIe M.2 Gen 5. Connectors satisfying the mechanical requirements of the PCIe specification at the performance required for Gen 5 and beyond are used as examples of connectors in which these techniques have been applied.

An electrical connector may have one or more rows of conductive elements held in a housing. The conductive elements may each have a mating end comprising a mating contact surface, configured for mating with a complementary mating contact surface of another electrical component, such as a printed circuit board or a complementary connector. Each conductive element may also have a mounting end comprising a mounting contact surface, configured for mounting the connector to another electrical component, such as a printed circuit board or a cable. Each conductive element may also have an intermediate portion, joining the mating end and the mounting end.

Some of the conductive elements may be configured for signal transmission. Differential transmission of a signal may reduce crosstalk. A differential signal may be carried on a pair of conductors, sometimes referred to as a "differential pair." A voltage difference between the conductors may represent a signal. A differential pair may be designed with preferential coupling between the pair of conductors. For example, two conductive paths of the differential pair may be arranged to run closer to each other than an adjacent signal conductor in the electrical connector. The electrical connector may include conductive elements configured for differential signals and/or single-ended signals.

Some of the conductive elements may be configured for connecting to ground. A plurality of ground conductors may be dispersed between signal conductors, for example, between pairs of signal conductors configured for differential transmission. The ground conductors may be arranged in a row in the length direction of a slot of a mated interface and installed into the insulating housing of the connector in any suitable manner. The two signal conductors may be a differential pair. It should be appreciated that ground conductors need not to be connected to earth ground, but may carry reference potentials, which may include earth ground, DC voltages or other suitable reference potentials.

The electrical connector may include a conductive shell at least partially enclosing the housing holding the conductive elements. The conductive shell may be configured to prevent the undesirable radiation caused by portions of the conductors exposed by the housing and provide shielding along the length direction of the conductors. For example, in a right angle configuration, the rear of the housing may have openings such that the conductors may be assembled from the rear. The conductive shell may have a side that substantially covers the rear of the housing. The conductive shell may enable the electrical connector to synergistically meet physical requirements set by industry standard and support higher frequency operation.

The conductive shell may be connected to the ground conductors. A side of the conductive shell may extend in the direction of the row and connected orthogonally to the portions of the ground conductors exposed by the insulating housing. In such a configuration, signal conductors between the two ground conductors may be constrained by a ground structure on at least two sides, and may be constrained on four sides in some embodiments, so that crosstalk is reduced.

Moreover, when the conductive shell is grounded and is close to the signal conductors, for example, 0.3 mm to 0.4 mm, radiation between two adjacent pairs of signal conductors may further be cut off. As a result, crosstalk may be significantly reduced, and signal integrity may be improved.

The conductive shell may be in electrical contact with a plurality of ground conductors through a plurality of contact members, respectively, so that the conductive shell is coupled to the plurality of ground conductors. Alternatively or additionally, the conductive shell may have a soldering tab that is configured to be soldered to a ground pad on a printed circuit board, thereby providing a conductive path for current to flow through the conductive shell to ground planes of the printed circuit board. The configuration enables the current to flow in a direction that is as parallel as possible to the signal paths so as to provide a desired shielding profile around the conductors.

Alternatively or additionally, the electrical connector may include a lossy member. The ground conductors may be connected to the lossy member, which may reduce interference and therefore improve the high-frequency performance. The lossy member may be strip-shaped. The lossy member may be coupled to the ground conductors adjacent to a mounting surface, where the impedance discontinuity and crosstalk herein may be worse. The lossy member may be made of a lossy material, which may absorb undesirable modes. The electrical connector may have both the conductive shell and the lossy member, which may enable the signal conductors between two ground conductors to be constrained by ground structures on more sides, such as four sides, so that the signal integrity may be improved more significantly.

A differential electrical connector may be regarded as "edge coupled" or "broadside coupled." In both types of the electrical connectors, the signal conductors that carrying signals may be rectangular in cross section. Two opposing sides of the rectangle are wider than other sides, forming the broad sides of the signal conductor. When a pair of signal conductors is positioned with broadsides of the pair of signal conductors closer to each other than to an adjacent conductive member, the electrical connector may be regarded as being broadside coupled. When a pair of signal conductors is positioned with narrower sides joining the broadsides closer to each other than to the adjacent conductive member, the electrical connector may be regarded as being edge coupled. In an embodiment using broadside coupled, when viewed in an arrangement direction of a plurality of conductors, the lossy member may not overlap with the broad sides of the signal conductors to avoid electrical coupling.

In order to ensure that the lossy member is not coupled to the signal conductors, the signal conductors may have smaller signal claws, and the ground conductors may have larger ground claws which may make contact with protrusions of the lossy member, so that the signal conductors may be spaced apart from the lossy member after assembly. In some embodiments, the protrusion may be provided at a position corresponding to each of the ground conductors and the signal conductors. In this way, if customized conductor assignments are required, a same lossy member may be used without preparing different lossy members corresponding to different conductor assignments. Because even if a ground conductor at a position is replaced with a signal conductor, the signal conductor does not make contact with the lossy member.

Compared with conventional electrical connectors, the electrical connectors provided by the embodiments of the present disclosure may effectively reduce crosstalk and improve the signal integrity. The electrical connectors may support a requirement of, for example, PCIe® M.2 Gen 5 (32 Gb/s) (a fifth generation of peripheral component interconnection standard), for high-speed performance. Moreover, the electrical connector may have backward compatibility, for example, the electrical connector may support the requirement of Gen 3 and Gen 4 for the high-speed performance. Techniques described herein may be integrated in any suitable combination into electrical connectors including, for example, embodiments described below.

As shown in FIG. 1 to FIG. 6, a right angle connector 610 may include an insulating housing 100, a plurality of conductors 200 and a conductive shell 400.

The insulating housing 100 may have a mating surface 110 and a mounting surface 120. As illustrated, the mating surface 110 and the mounting surface 120 are perpendicular to each other for the right angle connector. In other types of electrical connectors, such as a vertical connector, the mating surface 110 and the mounting surface 120 may be parallel to each other. Despite the type of the electrical connector, a function of the mating surface 110 and the mounting surface 120 in various electrical connectors may be similar. The mating surface 110 may form a mating interface of the right angle connector 610. A slot may be formed in the mating surface 110. The slot may be configured to receive elements such as an electronic card and a plug electrical connector. The slot may have an elongated strip shape. The mounting surface 120 may face elements such as a printed circuit board. Specifically, an electronic card may be inserted into the slot of the mating surface 110, and the mounting surface 120 may be mounted to the printed circuit board, such that the electronic card is electrically connected to the printed circuit board through the right angle connector 610.

Figure 3:
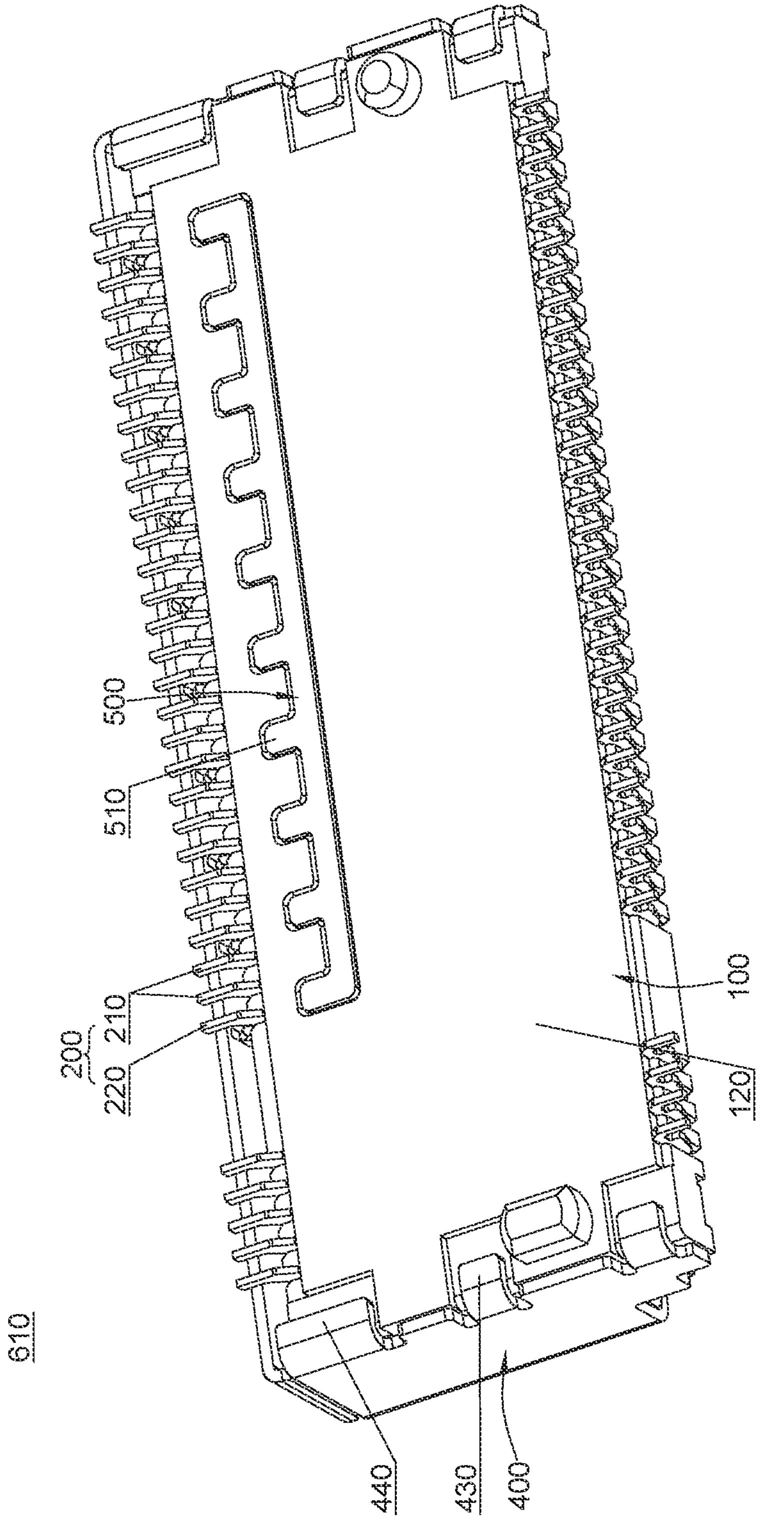
FIG. 3 is a bottom perspective view of the right angle connector of FIG. 1.
Figure 4:
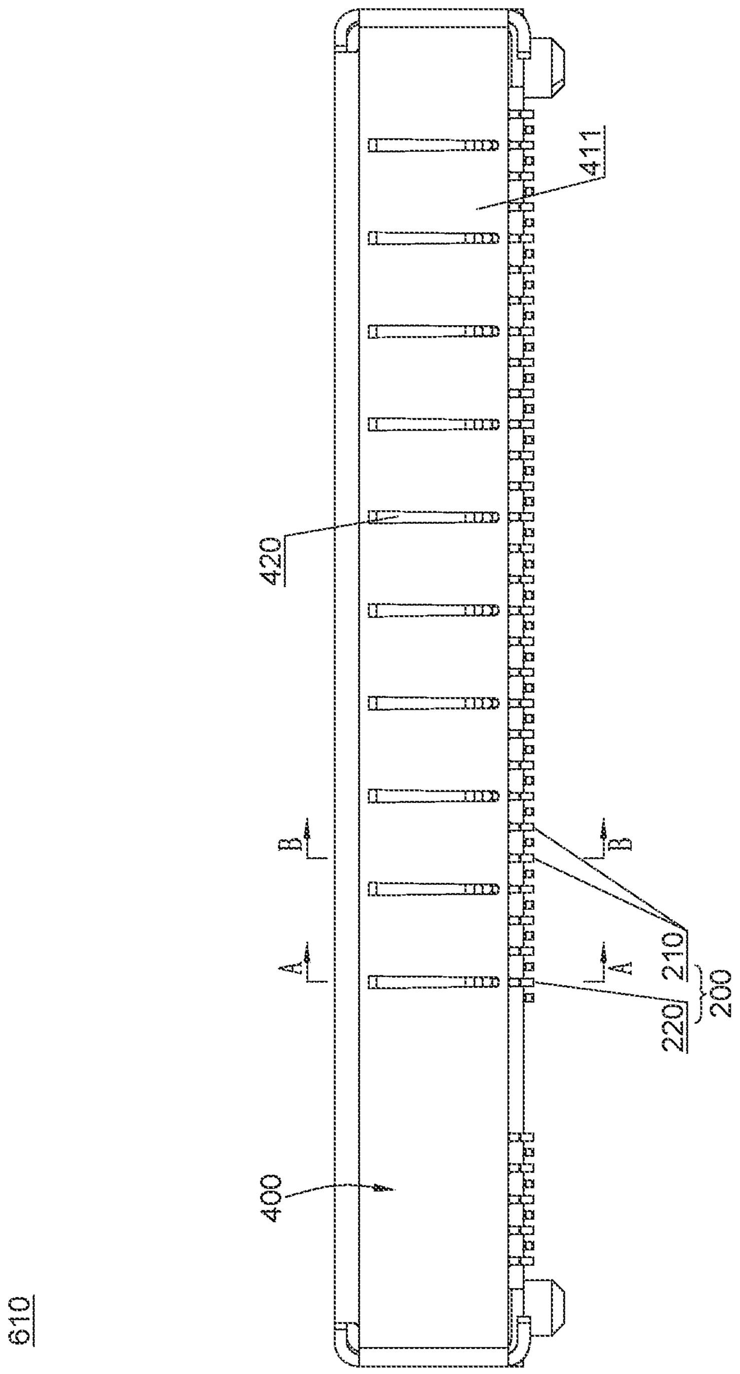
FIG. 4 is a rear view of the right angle connector of FIG. 1.
Figure 8:
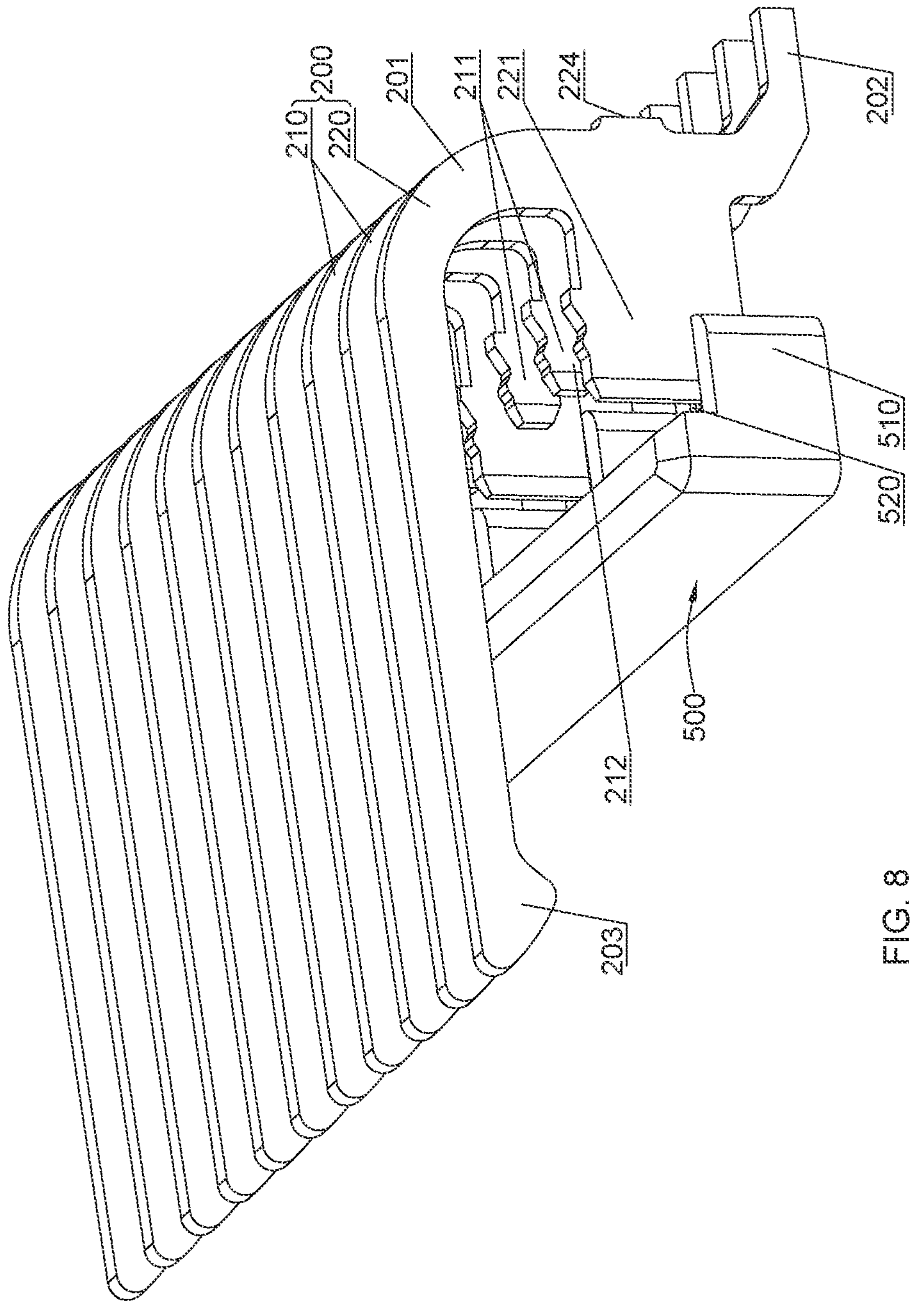
FIG. 8 is a perspective view of a plurality of conductors and a lossy member of the right angle connector of FIG. 1.

The plurality of conductors 200 may be provided in the insulating housing 100. The plurality of conductors 200 may be spaced apart from each other to ensure that the conductors 200 are electrically insulated from each other. Each of the plurality of conductors 200 may include an intermediate portion 201, a mounting end 202 and a mating end 203, as shown in FIG. 8. The intermediate portions 201 may hold the plurality of conductors 200 on the insulating housing 100. The mounting ends 202 may extend beyond the mounting surface 120 from the intermediate portions 201, as shown in FIG. 3. The mounting ends 202 may be configured to be electrically connected to the printed circuit board when the right angle connector 610 is connected to the printed circuit board. For example, the mounting ends 202 may be electrically connected to the printed circuit board through soldering or any other proper manners. The mating end 203 may extend from the intermediate portion 201 to the mating surface 110, as shown in FIG. 1. Each mating end 203 may be used for making electrical contact with a gold finger on elements such as the electronic card, so as to electrically connect the right angle connector 610 to the elements such as the electronic card.

The plurality of conductors 200 may include a plurality of signal conductors 210 and a plurality of ground conductors 220. The plurality of ground conductors 220 may be interspersed among the plurality of signal conductors 210. The plurality of signal conductors 210 and the plurality of ground conductors 220 may be arranged according to various required assignments. In the embodiments shown in the drawings, the signal conductors 210 appear in pairs to form differential signal conductor pairs for transmitting differential signals. A ground conductor 220 may be located between any two adjacent pairs of signal conductors 210. The differential signal conductor pairs may be used for transmitting high-speed signals to reduce crosstalk. Alternatively or additionally, each signal conductor 210 may also be used for transmitting a single-ended signal.

The conductive shell 400 may be made of a metal material. Further, the conductive shell 400 may be stamped from a metal sheet, or be formed by soldering or any other suitable manners. The conductive shell 400 may cover at least a part of the insulating housing 100. The conductive shell 400 may be coupled to the plurality of ground conductors 220, for example, with the intermediate portions 201 of the plurality of ground conductors 220. In this manner, shielding is formed between adjacent signal conductors or signal conductor pairs. A signal carried on one signal conductor 210 may be prevented from generating crosstalk on another signal conductor 210. Shielding may also impact impedance of each conductor 200, which may further contribute to obtaining the desired electrical properties.

Figure 7:
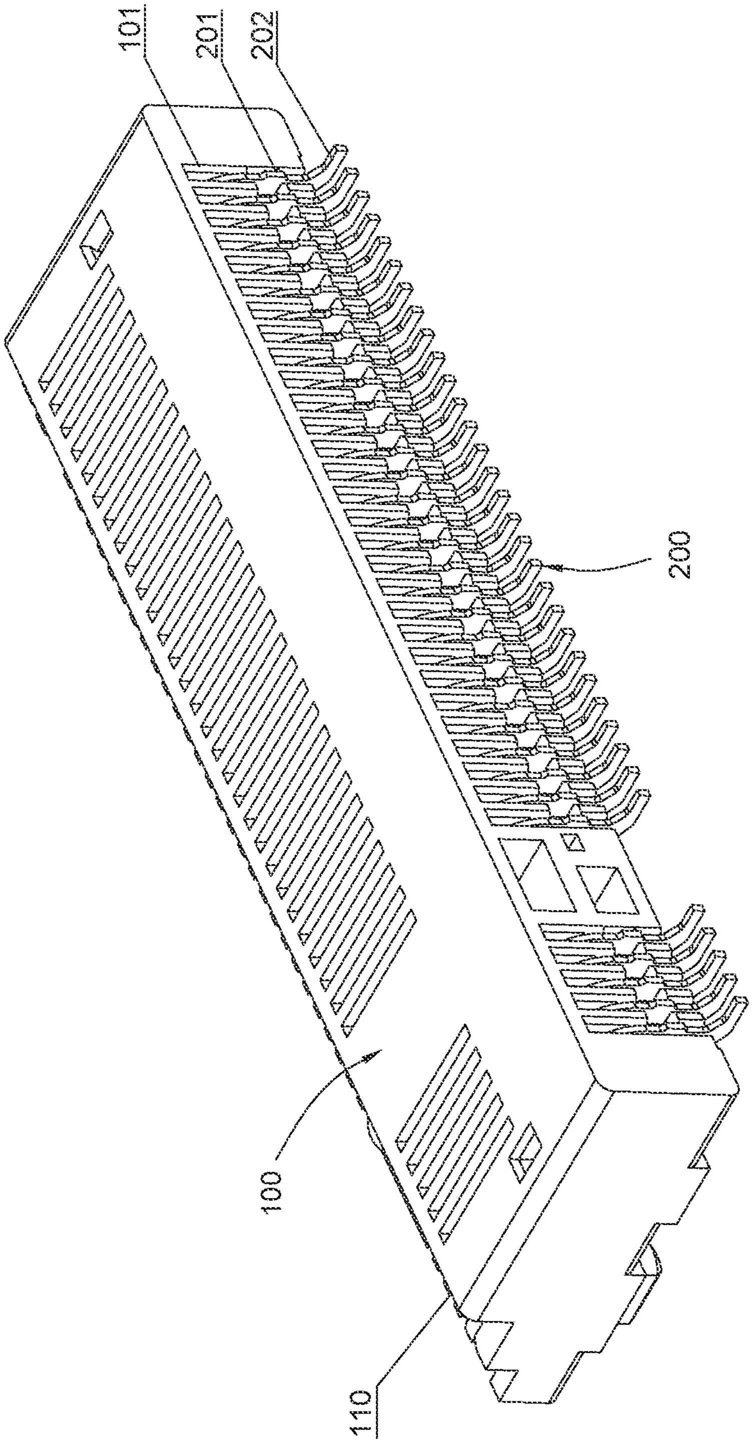
FIG. 7 is a perspective view of the right angle connector of FIG. 1, with a conductive shell hidden.

The insulating housing 100 exposes the plurality of conductors 200. As shown in FIG. 7, the intermediate portions 201 of the conductors 200 are exposed by the insulating housing 100 at the rear opposite to the front where the mating surface 110 is positioned. The insulating housing 100 may be molded from insulating materials such as plastics. The insulating housing 100 is usually an integral member. A mounting opening 101 corresponding to each of the plurality of conductors 200 is formed at the rear of the insulating housing 100. Each conductor 200 may be inserted into a corresponding conductor mounting channel (not shown) in the insulating housing 100 from the corresponding mounting opening 101, which is the reason why the intermediate portion 201 of each conductor 200 is usually exposed by the insulating housing 100. A slot may be provided on the mating surface 110, The mounting openings 101 may be formed at the rear or the side of the insulating housing 100, or in the mounting surface 120. Specific positions of mounting openings 101 may depend on the type of the electrical connector. By reasonably configuring a shape and structure of conductor mounting channels in the insulating housing 100, the conductors 200 may be held in conductor mounting channels correspondingly. The conductor mounting channels may communicate with the mounting openings 101 and extend to the mating surface 110 and the mounting surface 120. In the illustrated embodiment, the mounting openings 101 extend to the mounting surface 120 through the conductor mounting channels. The conductors 200 may be installed in place in the conductor mounting channels after being inserted from the mounting openings 101 respectively, and the mounting ends 202 used for making an electrical connection with the printed circuit board may protrude from the mounting surface 120. The mating ends 203 may extend to the mating surface 110.

The conductive shell 400 may cover the plurality of conductors 200. The conductive shell 400 may be coupled to the exposed portions of the plurality of ground conductors 220. In this manner, the conductive shell 400 may not only prevent undesirable radiation caused by the exposed portions of the conductors 200, but further provide shielding in the length directions of the conductors 200. The configuration enables the current to flow in a direction that is as parallel as possible to the signal paths, and therefore enables the conductive shell 400 to work well as a shield.

Due to the structural characteristics of the right angle connector 610, it is difficult for the insulating housing 100 to be completely covered by the conductive shell 400. For example, in the right angle connector 610 shown in the figures, the mating surface 110 of the insulating housing 100 is regarded as the front surface, and the mounting surface 120 is regarded as a bottom surface. The conductive shell 400 may cover at least the rear surface of the insulating housing 100, and the front surface and the bottom surface thereof are not covered by the conductive shell 400 for the purpose of electrical connection with other members. In order to enable the conductive shell 400 to be fixed on the insulating housing 100, the conductive shell 400 may further cover a top surface of the insulating housing 100 and, optionally, two opposite side surfaces of the insulating housing 100.

Figure 10:
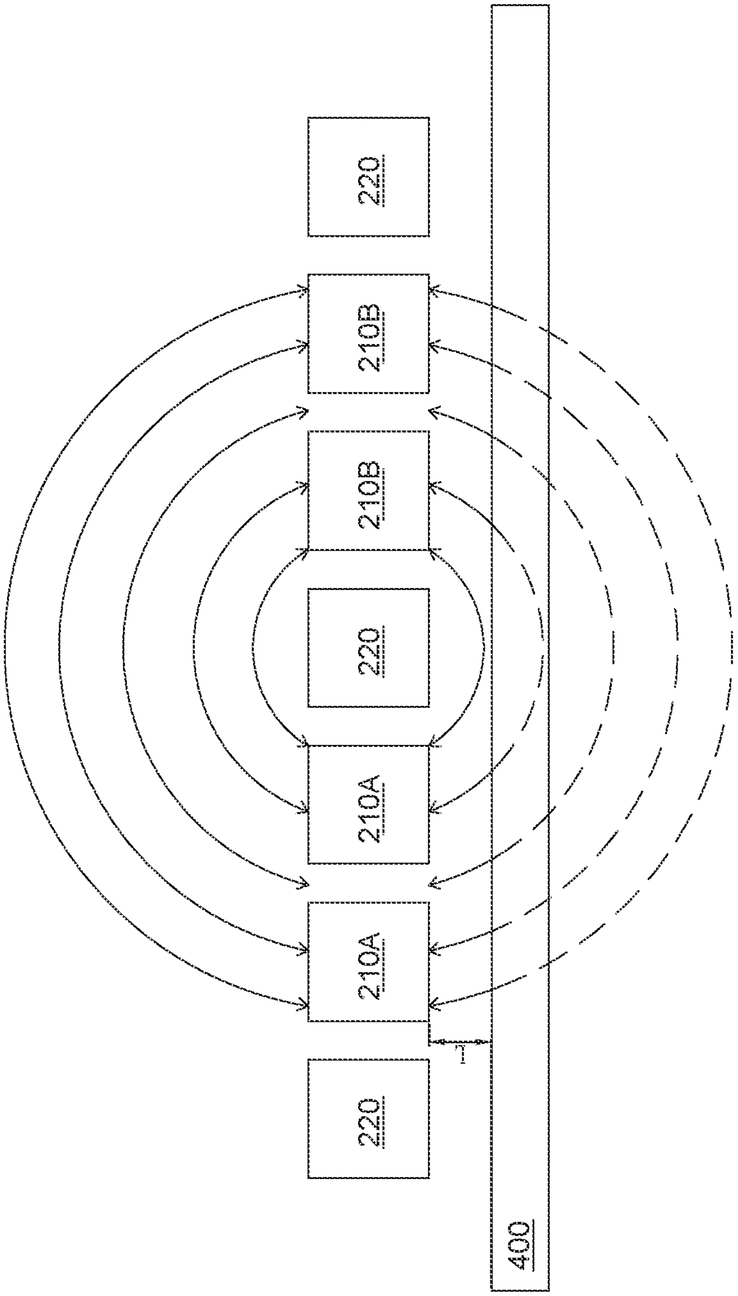
FIG. 10 is a schematic diagram illustrating an effect that may be provided by the conductive shell of the right angle connector of FIG. 1.

The conductive shell 400 may prevent radiation from entering into or leaving from the right angle connector 610. Referring to FIG. 10, radiation may be generated due to coupling between two adjacent pairs of signal conductors 210A and 210B. Radiation is schematically illustrated as an arc in the drawing. This coupling is undesirable because it may lead to crosstalk. By providing the conductive shell 400, more than about half of radiation between the pair of signal conductors 210A and the other pair of adjacent signal conductors 210B may be cut off (as shown by a dotted line in the drawing). Therefore, the conductive shell 400 may reduce crosstalk and effectively improve a signal transmission speed and the signal integrity.

Therefore, the right angle connector 610 provided by the embodiment of the present disclosure may reduce crosstalk between adjacent signal conductors or signal conductor pairs by providing the conductive shell 400 and electrically coupling the conductive shell 400 with the ground conductors 220. In this manner, the impact on the signal transmission speed of the right angle connector 610 is alleviated, and the signal transmission speed and the signal integrity are effectively improved.

In some embodiments, the conductive shell 400 may make electrical contact respectively to the plurality of ground conductors 220 through a plurality of contact members. Each ground conductor 220 may make electrical contact with the conductive shell 400 through the corresponding contact member. The conductive shell 400 may make direct electrical contact with the plurality of ground conductors 220 without providing such intermediate contact members. However, higher machining accuracy may be required by the direct electrical contact. The plurality of contact members may have any structures. For example, the plurality of contact members may be provided between the conductive shell 400 and the plurality of ground conductors 220, or the plurality of contact members may be provided on the conductive shell 400, or the plurality of contact members may be provided on the plurality of ground conductors 220. In some embodiments, the plurality of contact members may be integrated with the conductive shell 400, or each ground member and the corresponding ground conductor 220 may be integrated into one body, which may reduce the processing difficulty. The contact member may be made to have certain elasticity, such that reliable electrical contact is created between the conductive shell 400 and the plurality of ground conductors 220.

In some embodiment, the plurality of contact members may extend from the conductive shell 400 to the inside of the conductive shell 400. Each contact member may make electrical contact with the corresponding ground conductor 220. In the embodiments shown in FIG. 1 to FIG. 6, the contact member may be configured as a member 420. The conductive shell 400 may cover the rear surface of the insulating housing 100 and may be used for covering the mounting openings 101 shown in FIG. 7. The conductive shell 400 may include a side 411 extending substantially in parallel to the rear of the insulating housing 100. A plurality of members 420 may be provided on the side 411. In this manner, the side 411 may not only cover the exposed portions of the signal conductors 210 to have the shielding effect, but also support the members 420. The plurality of members 420 may tightly abut against the plurality of ground conductors 220 due to elasticity to form reliable electrical contact. Providing the members 420 on the side 411 also facilitates electrical contact with the plurality of ground conductors 220.

The plurality of members 420 may extend from the conductive shell 400 to the inside thereof. The plurality of members 420 may be integrated with the conductive shell 400. For example, the conductive shell 400 may be formed by stamping. A plurality of U-shaped cuts may be formed at positions corresponding to the plurality of ground conductors 220 on the conductive shell 400 formed by stamping, and then the portions surrounded by the cuts are bent towards the interior of the conductive shell 400. In this manner, bended portions each may form a member 420. Such conductive shell 400 can be manufactured easily and conveniently.

Each member 420 may include a first inclined section 421 and a second inclined section 422. The first inclined sections 421 may extend obliquely from the conductive shell 400 towards the corresponding ground conductors 220. The second inclined sections 422 may extend obliquely from the first inclined sections 421 away from the corresponding ground conductors 220. Each first inclined section 421 and the corresponding second inclined section 422 may substantially form a V-shape, and an opening of each V-shape may face the conductive shell 400. A contact portion 423 may be formed at the joint of each first inclined section 421 and the corresponding second inclined section 422. Each contact portion 423 may make contact with the corresponding ground conductor 220. Therefore, each member 420 may make contact with the corresponding ground conductor 220, which may improve the reliability of electrical contact.

Disposing the plurality of contact members on the conductive shell 400 can leave the structure of the existing ground conductors 220 unchanged, or only make minor changes to the structure. Such changes may affect the electrical performance of the ground conductors 220. Moreover, it further provides the possibility to reduce the processing difficulty by disposing the plurality of contact members on the conductive shell 400.

Figure 5:
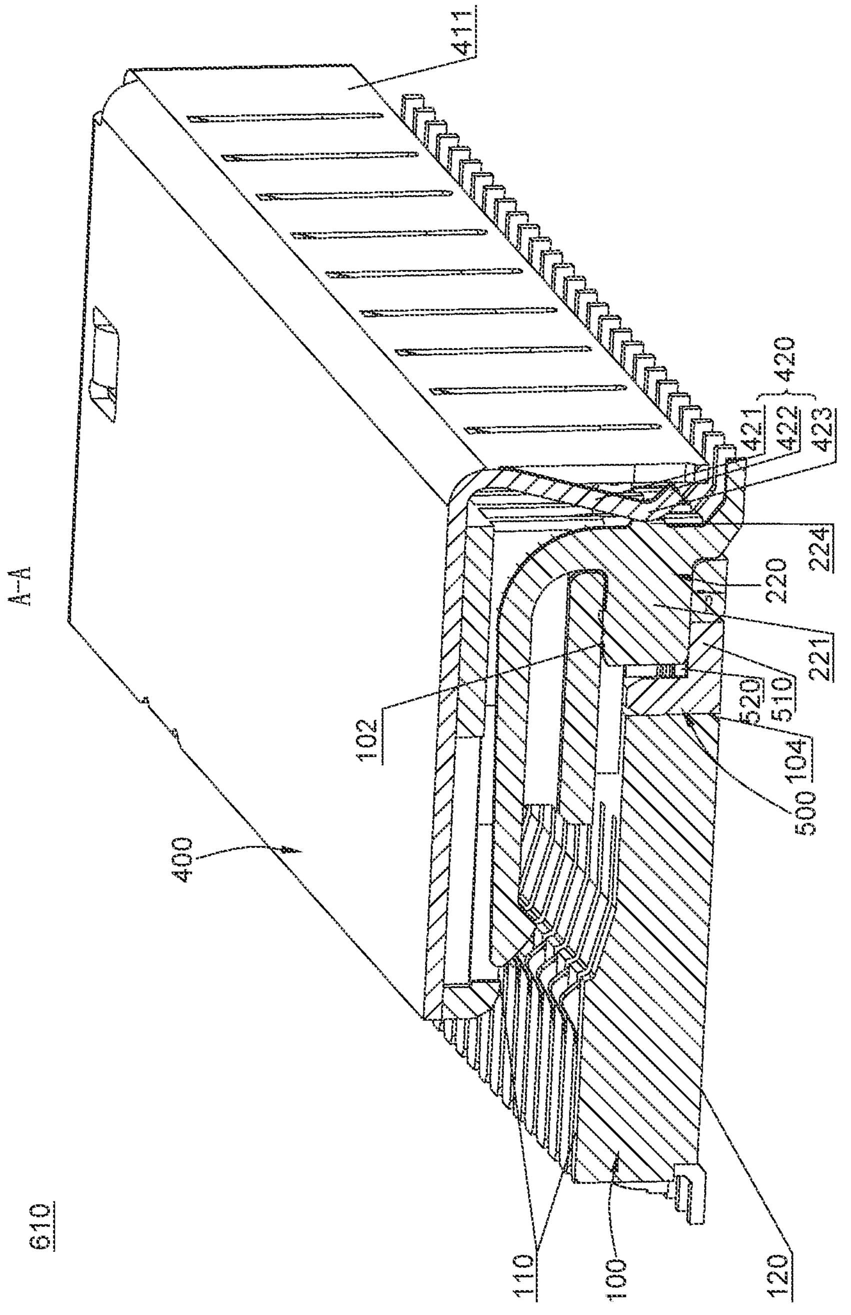
FIG. 5 is a cross-sectional perspective view of the right angle connector of FIG. 1 along the line marked "A-A" in FIG. 4.

Optionally, a projection 224 may be provided on each of the plurality of ground conductors 220. The projection 224 may extend beyond the insulating housing 100. As shown in FIG. 5, members 420 may face respective projections 224. The members 420 may abut against the respective projections 224, so that the members 420 are coupled to the corresponding ground conductors 220.

Figure 15:
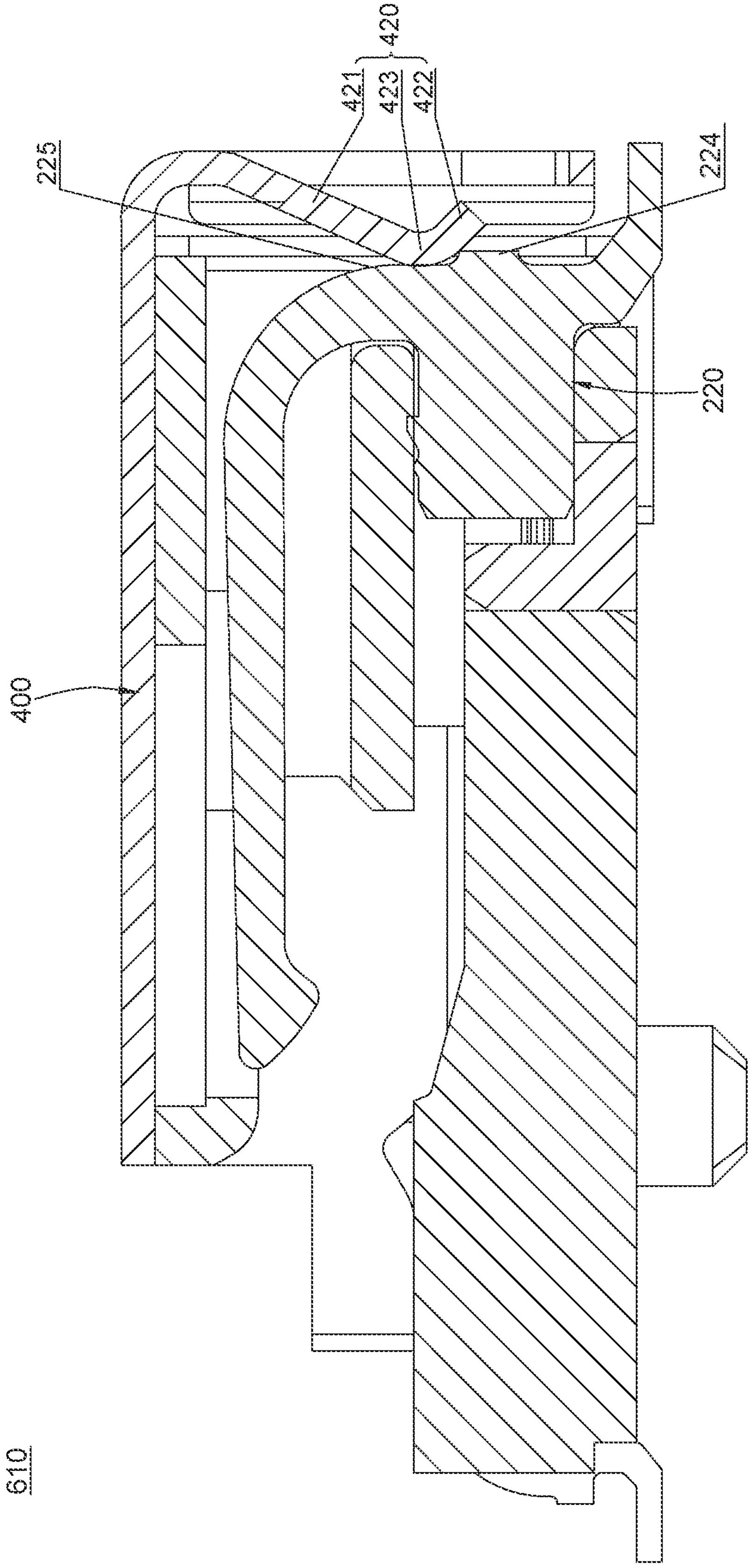
FIG. 15 is a cross-sectional view of a right angle connector, according to some embodiments.

Alternatively or additionally, the members 420 may abut against the corresponding ground conductor 220 on the top of the projection 224. The conductive shell 400 may be mounted on the insulating housing 100 from above. As shown in FIG. 15, a member 420 may abut against a top surface of the projection 224 on the corresponding ground conductor 220 and a side surface 225 of the ground conductor 220 opposite to the member 420. During assembly, each member 420 may gradually approach the corresponding projection 224 and finally abut against the corresponding projection 224. Thus, each member 420 may make electrical contacts with the corresponding ground conductor 220 at two positions, such that the reliability of the electrical contact is improved.

Additionally or alternatively, contact members may extend from the corresponding ground conductors 220 towards the conductive shell 400. The contact members may make an electrical contact with the conductive shell 400. For example, the contact members may be connected to the corresponding ground conductor 220 in a manner such as soldering or bonding, or formed integrally with the corresponding ground conductor 220. In the embodiment shown in FIG. 16 and FIG. 17, an extension part 226 may be provided on each of the plurality of ground conductors 220. Each extension part 226 may form a contact member. Each extension part 226 may extend toward the conductive shell 400. Each extension part 226 may make electrical contact with the conductive shell 400.

Figure 16:
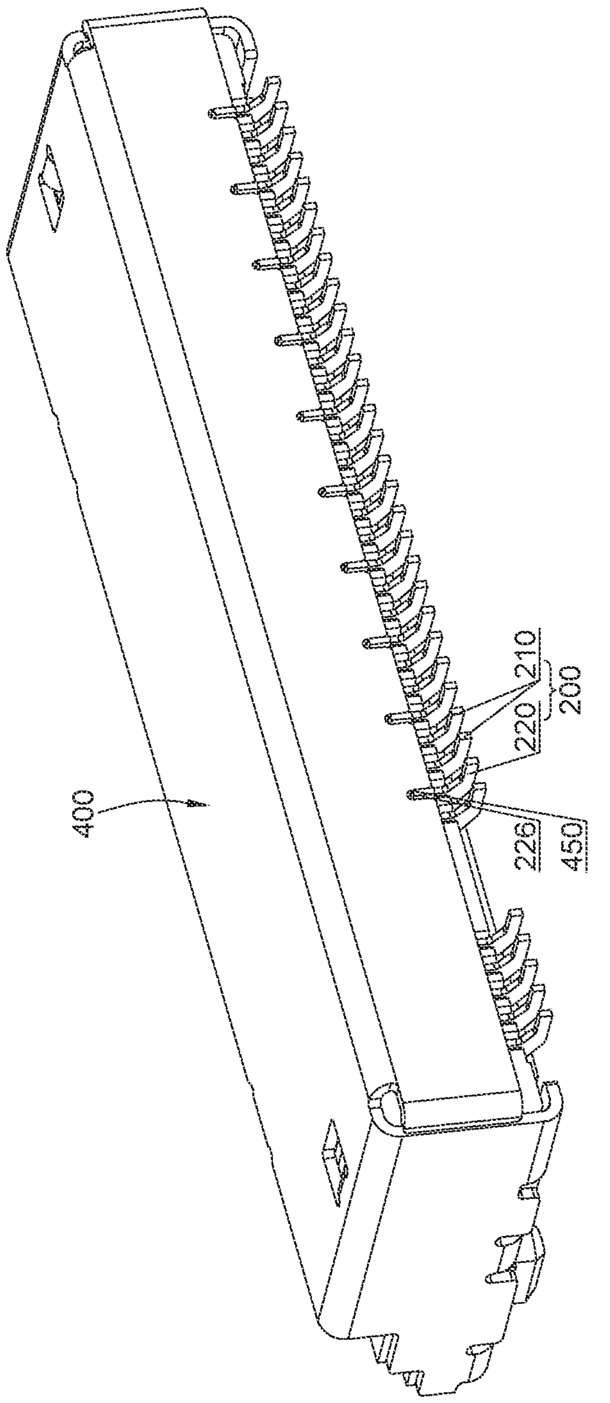
FIG. 16 is a perspective view of a right angle connector, according to some embodiments.
Figure 17:
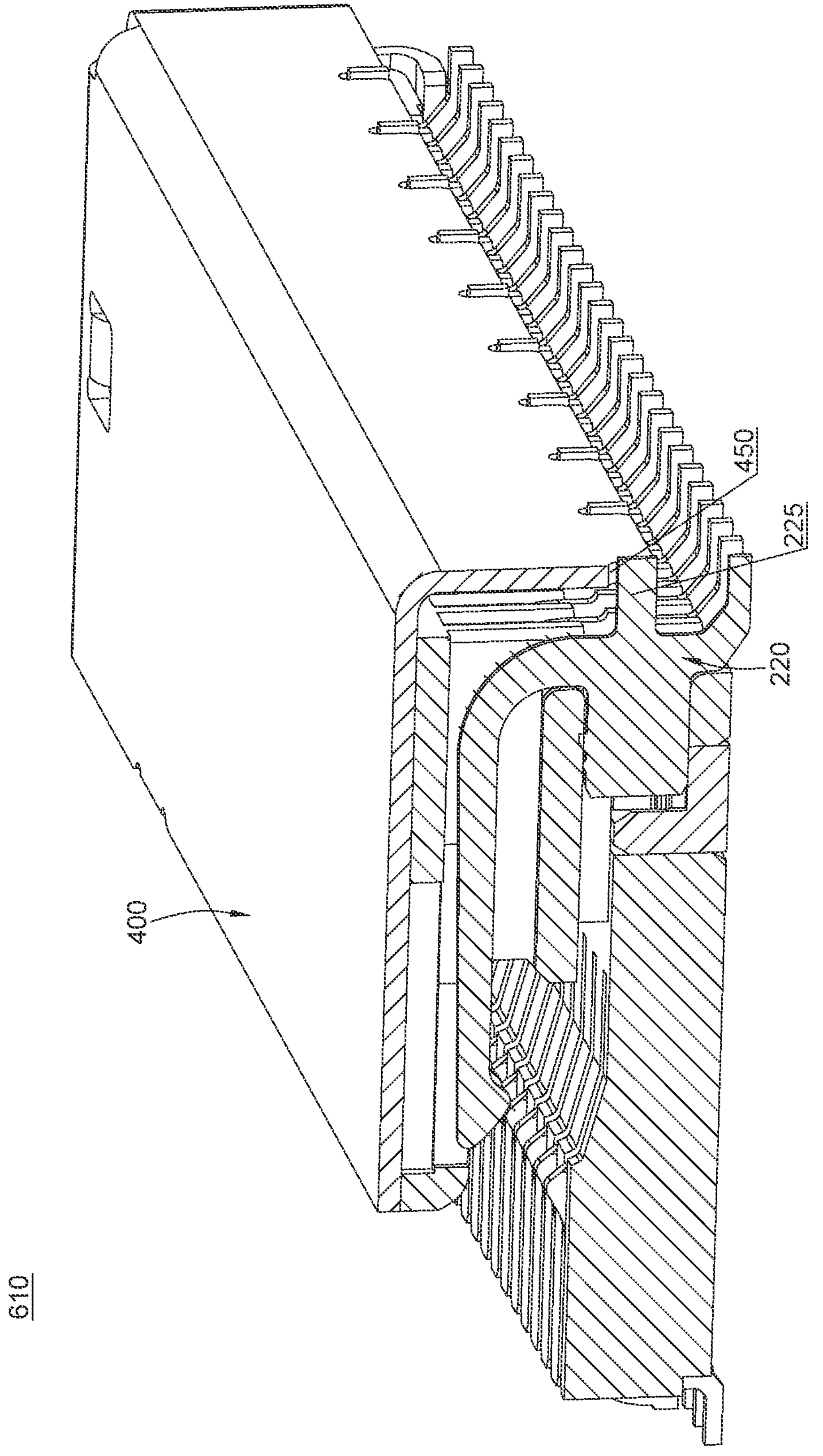
FIG. 17 is a cross-sectional perspective view of the right angle connector of FIG. 16.

Further, as shown in FIG. 16 and FIG. 17, a plurality of through holes 450 corresponding to the plurality of contact members may be formed in the conductive shell 400. Each of the plurality of contact members (e.g., the extension part 226) may be inserted into the corresponding through hole 450. In this manner, each of the plurality of contact members may make electrical contact with the conductive shell 400. By providing the through holes 450, each of the plurality of contact members may be more firmly connected to the conductive shell 400, so as to improve the stability of electrical contact.

In some embodiments, as shown in FIG. 10, a distance L between the conductive shell 400 and a plurality of signal conductors 210 may be in a range from 0.2 mm to 0.5 mm. Further, the distance L may be in a range from 0.3 mm to 0.4 mm. The distance L being too large may reduce the effect of reducing crosstalk. Although the distance L being smaller may improve the effect of reducing crosstalk, the production difficulty may be increased, causing an increase in production cost. Therefore, the distance L within the range is reasonable.

In some embodiments, each contact member and a corresponding ground conductor 220 may be located in a plane parallel to the plurality of signal conductors 210. In some embodiments, each contact member may have a substantially same width as the corresponding ground conductor 220. In this manner, the current through the conductive shell 400 may flow in a direction as parallel as possible to signal paths. Therefore, the conductive shell 400 has good effect of reducing crosstalk.

In some embodiments, as shown in FIG. 3, a tab 430 may be provided on the conductive shell 400. The conductive shell 400 may be fixed on the insulating housing 100 through the tab 430. The conductive shell 400 may be fixed on the insulating housing 100 through the tab 430 in any suitable manner such as clamping and inserting. As illustrated, the tab 430 may be shaped as a hook and extend from a side to the bottom of the conductive shell 411. Such a configuration enables the tab 430 to have a contact surface compatible to a contact surface provided by separate solders tabs of conventional designs and therefore may be mounted to printed circuit boards having a footprint design for the conventional connectors. The tab 430 and the conductive shell 400 may form an integral member. By providing the tab 430, the conductive shell 400 and the insulating housing 100 may be relatively fixed, creating a stable relative position therebetween. The number of tabs 430 may be multiple to ensure the firmness of connection between the conductive shell 400 and the insulating housing 100. In this case, one or more of the tabs 430 may be configured as a ground pad for being soldered to the printed circuit board. In this manner, the tabs 430 may not only connect the conductive shell 400 with the insulating housing 100, but also connect the conductive shell 400 with the printed circuit board, and further electrically connect the conductive shell 400 to the ground pad of the printed circuit board.

As shown in FIG. 3, an additional connecting part 440 may be provided on the conductive shell 400. The connecting part 440 may be used for being connected to the printed circuit board. In this manner, the right angle connector 610 may be connected to the printed circuit board. The right angle connector 610 may be connected to the printed circuit board through the connecting parts 440 in any suitable manner such as clamping and inserting. The right angle connector 610 and the printed circuit board may be relatively fixed by the connecting parts 440, so as to create a stable relative position therebetween.

In the prior art where the conductive shell 400 is not provided, connecting parts are needed to be provided on the insulating housing 100. In an aspect, the insulating housing 100 is usually made of insulating materials such as plastics, and the mechanical strength thereof is worse than that of metal materials. Therefore, the mechanical connection strength between the insulating housing 100 and the printed circuit board may not be sufficient. In another aspect, since the ground conductors 220 in the conductor 200 are desired to be grounded, it is necessary to provide an additional grounding member instead of being directly grounded through the insulating housing 100. That is, in the present application, the conductive shell 400 may further provide the effects of mechanically fixing the electrical connector to the printed circuit board and directly electrically connecting to ground circuits of the printed circuit board through the conductive shell 400.

The connecting part 440 may be configured to mount to a contact pad of a printed circuit board as the tab 430 in some embodiments or not in other embodiments.

The right angle connector 610 may be soldered to the printed circuit board through tabs mounted to contact pads of the printed circuit board. A current to flow through the conductive shell 400 may flow to the printed circuit board through the tabs, so that the conductive shell 400 has a well effect on reducing crosstalk. As discussed above, such a configuration removes the need of separate solders tabs that are held in the insulating housing of conventional designs. The conductive shell 400 may be made of a metal material, and thus the conductive shell 400 may still be manufactured integrally with the soldering tab provided thereon. The machining process of the conductive shell 400 is not significantly complicated, and thus keeping the cost of manufacture low.

Figure 6:
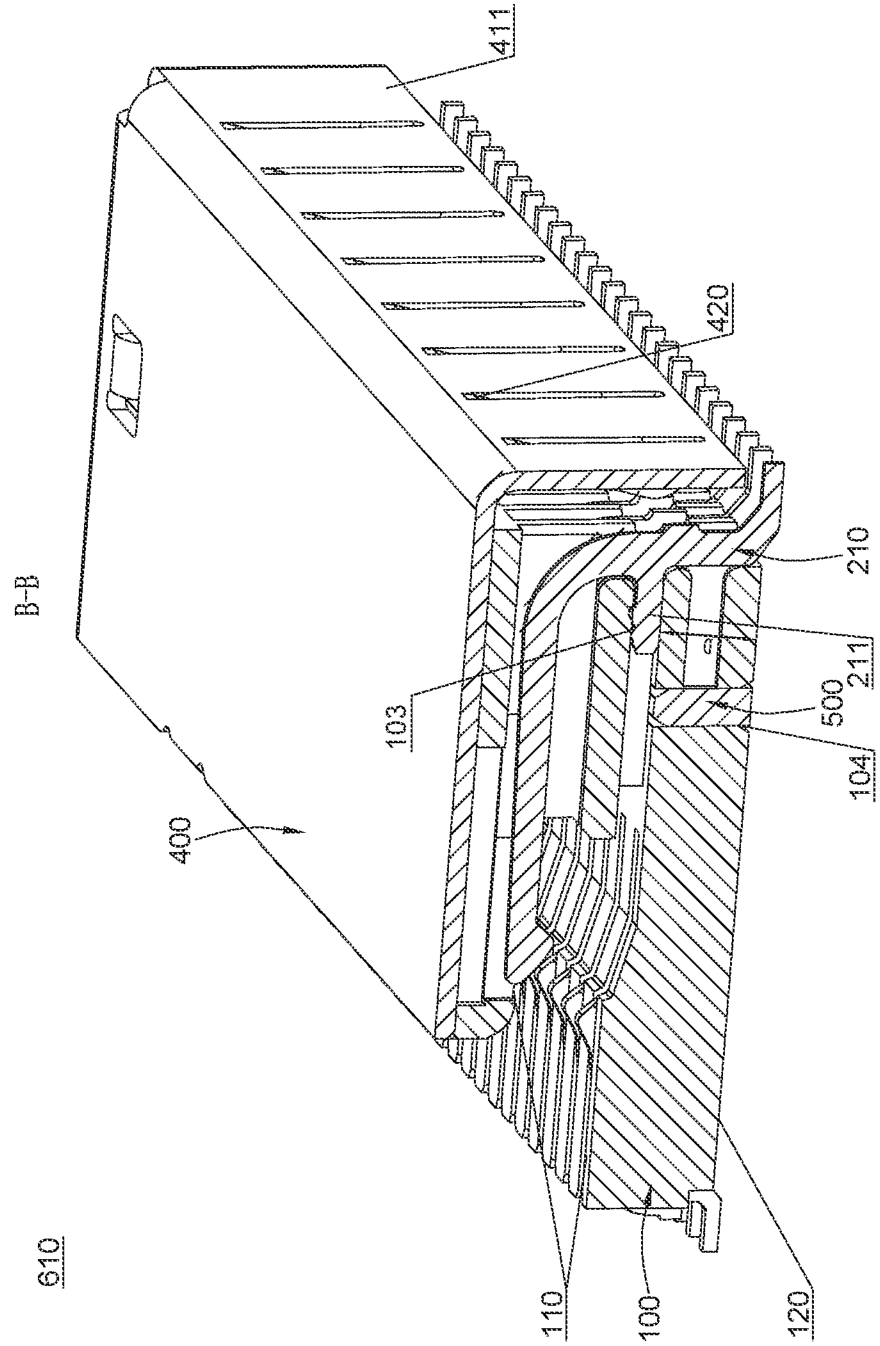
FIG. 6 is a cross-sectional view of the right angle connector of FIG. 1 along the line marked "B-B" in FIG. 4.

In some embodiments, as shown in FIGS. 3 and 5-6, the right angle connector 610 may include a lossy member 500. The lossy member 500 may be coupled to the plurality of ground conductors 220.

Materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within ground structures of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz. Alternatively, lossy material may be identified from measurements made at a single frequency, such as 15 GHz.

Loss may result from interaction of an electric field component of electromagnetic energy with the material, in which case the material may be termed electrically lossy. Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The “electric loss tangent” is the ratio of the imaginary part to the real part of the complex electrical permittivity of the material.

Electrically lossy materials can also be formed from materials that are generally thought of as conductors, but are relatively poor conductors over the frequency range of interest. These materials may conduct, but with some loss, over the frequency range of interest such that the material conducts more poorly than a conductor of an electrical connector, but better than an insulator used in the connector. Such materials may contain conductive particles or regions that are sufficiently dispersed that they do not provide high conductivity or otherwise are prepared with properties that lead to a relatively weak bulk conductivity compared to a good conductor such as copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000 Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy member need not have uniform properties over its entire volume. A lossy member, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy member may be formed by molding or otherwise shaping the binder with filler into a desired form. The lossy material may be molded over and/or through openings in conductors, which may be ground conductors or shields of the connector. Molding lossy material over or through openings in a conductor may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two shot molding operation. The lossy material may press against or be positioned sufficiently near a ground conductor that there is appreciable coupling to a ground conductor. Intimate contact is not a requirement for electrical coupling between lossy material and a conductor, as sufficient electrical coupling, such as capacitive coupling, between a lossy member and a conductor may yield the desired result. For example, in some scenarios, 100 pF of coupling between a lossy member and a ground conductor may provide an appreciable impact on the suppression of resonance in the ground conductor. In other examples with frequencies in the range of approximately 10 GHz or higher, a reduction in the amount of electromagnetic energy in a conductor may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to a conductor, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical lossy magnetic materials or mixtures containing lossy magnetic materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

Lossy portions also may be formed in a number of ways. In some examples the binder material, with fillers, may be molded into a desired shape and then set in that shape. In other examples the binder material may be formed into a sheet or other shape, from which a lossy member of a desired shape may be cut. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

The lossy member 500 may effectively suppress a resonance in the ground conductor 220, and such resonance may interfere with a signal. Suppressing the resonance may reduce signal interference, such that the signal transmission speed and the signal integrity are effectively improved. Moreover, the lossy member 500 may further implement double electrical coupling with the ground conductors 220 together with the conductive shell 400. In this manner, even if the electrical coupling between the ground conductors 220 and one of the lossy members 500 and the conductive shell 400 fails, the other one may further play a shielding role to ensure the stability of signal transmission.

As shown in FIGS. 5-6, first positions on the plurality of ground conductors 220 are coupled to the conductive shell 400, and second positions of the plurality of ground conductors 220 are coupled to the lossy member 500. The first positions and the second positions may be located at same positions or spaced by a preset distance. That is, electrical contact parts between the conductive shell 400 and the ground conductors 220 and electrical contact parts between the lossy member 500 and the ground conductors 220 may be same or be spaced by the preset distance. Thus, the conductive shell 400 and the lossy member 500 may be electrically connected to the ground conductors 220 at different positions, so as to prevent a short circuit caused by a too small distance between the conductive shell 400 and the lossy member 500 from affecting the shielding effect of the signal conductor 210.

As illustrated, the conductive shell 400 and the lossy member 500 may be coupled to the plurality of ground conductors 220 on both sides of the plurality of conductors 200, respectively. The conductive shell 400 may be provided on the outside of the insulating housing 100, and the lossy member 500 may be embedded into the inside of the insulating housing 100. As shown in FIG. 8, for the right angle connector 610, the lossy member 500 may be provided on the inner sides of substantially L-shaped conductors 200, which appears to be half surrounded by the conductors 200. As shown in FIG. 3, the lossy member 500 may be embedded into the bottom of the insulating housing 100 from the bottom surface. The conductive shell 400 may be coupled to the conductors 200 on the outer side of the conductors 200. The conductors 200 may run through between the conductive shell 400 and the lossy member 500. Thus, both left and right sides of each pair of signal conductors 210 are shielded by adjacent ground conductors 220 respectively, and both front and rear sides of each pair of signal conductors 210 are shielded by the conductive shell 400 and lossy member 500 respectively. Each pair of signal conductors 210 passes through a frame enclosed by the ground conductors 220, the conductive shell 400 and the lossy member 500. In this manner, each pair of signal conductors 210 may be shielded and constrained on four sides, and thus crosstalk may be significantly reduced and the signal integrity may be improved.

In some embodiments, as shown in FIG. 3, the lossy member 500 may be arranged adjacent to the mounting surface 120 where the impedance discontinuity and crosstalk herein may be more serious. Disposing the lossy member 500 closer to the mounting ends of the conductors 200 may provide better electrical performance.

In some embodiments, as shown in FIGS. 3, 5 and 8, the lossy member 500 may have a plurality of first protrusions 510. The plurality of first protrusions 510 may be coupled to the plurality of ground conductors 220 respectively. No protrusion is provided at positions corresponding to the signal conductors 210, so as to avoid electrical coupling of the lossy member 500 with the plurality of signal conductors 210.

Figure 9A:
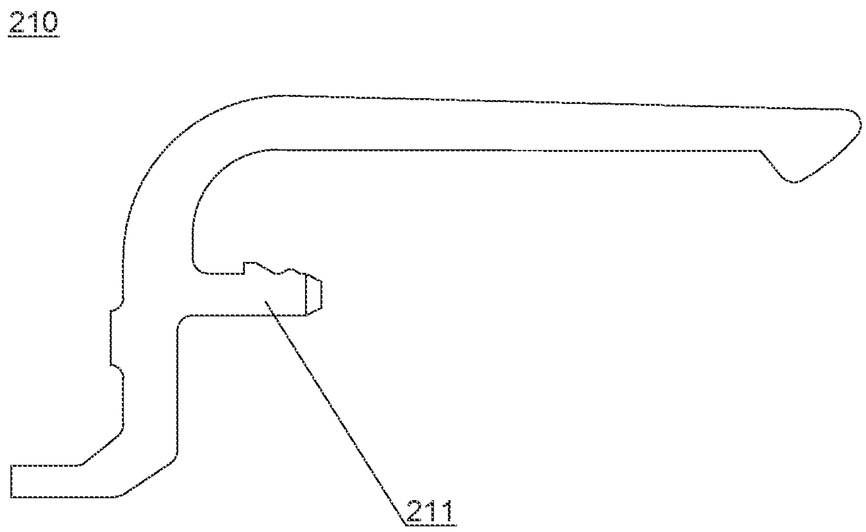
FIG. 9A is a side view of a signal conductor of the plurality of conductors shown in FIG. 8.
Figure 9B:
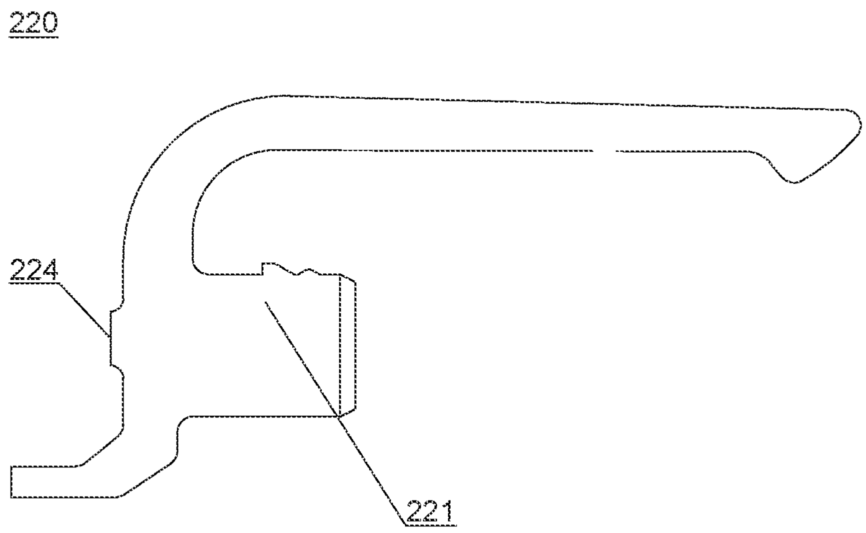
FIG. 9B is a side view of a ground conductor of the plurality of conductors shown in FIG. 8.
Figure 9C:
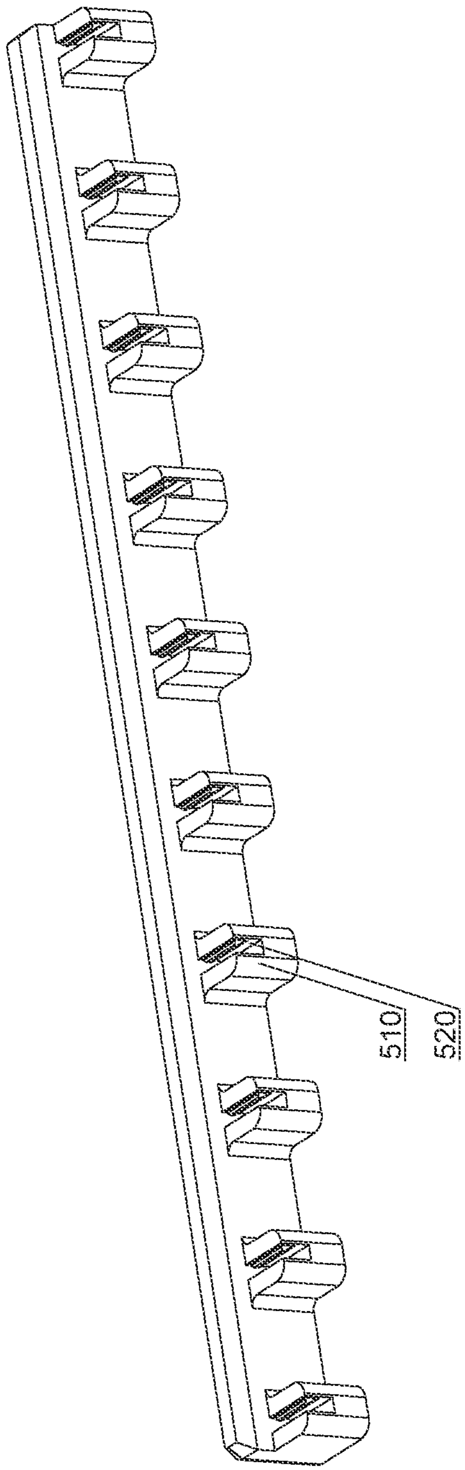
FIG. 9C is a perspective view of the lossy member shown in FIG. 8.

Further, as shown in FIGS. 5, 8 and 9C, a groove 520 may be formed in each of the plurality of first protrusions 510. Each of the plurality of ground conductors 220 may have a ground claw 221 extending outwards. The grooves 520 may receive the ground claws 221 of the ground conductors 220 correspondingly. In this manner, it may be easier for assembly, and a structure of electrical coupling between each first protrusion 510 and the corresponding ground conductor 220 is more reliable, which improves the reliability of the right angle connector 610.

In some embodiments, the lossy member 500 may further have a plurality of second protrusions (not shown). The plurality of second protrusions may correspond to the plurality of signal conductors 210. The second protrusions may have a same structure as the first protrusions 510. Specifically, the first protrusions are of the same structure as each other, and the second protrusions are of the same structure as each other. There is further a same structure between the first protrusions and the second protrusions. Therefore, the first protrusions and the second protrusions may also be referred to as protrusions for short. That is, it appears that a protrusion is provided at a position corresponding to each conductor 200 on the lossy member 500. Compared with the embodiment shown in FIG. 9C, two second protrusions may be further provided between two adjacent first protrusions 510. However, after assembly, each of the plurality of signal conductors 210 may be spaced apart from the corresponding second protrusion. Therefore, structures of the signal conductors 210 and the ground conductors 220 may be different. As shown in FIGS. 9A-9B, the signal claw 211 of the signal conductor 210 may have a height lower than that of the ground claw 221 of the ground conductor 220. For example, the top of the signal claw 211 and the top of the ground claw 221 may be basically flush, but the bottom of the signal claw 211 is obviously above the bottom of the ground claw 221. In this manner, when the first protrusions 510 are coupled to the ground conductors 220, the second protrusions may be spaced apart from the signal conductors 210 in a vertical direction.

With this arrangement, even if positions of the signal conductors 210 and the ground conductors 220 change, the structure of the lossy member 500 does not need a change. Thus, the inventory and management cost of the lossy member 500 may be reduced. On this basis, for the right angle connector 610 of the present disclosure, the number and assignment of the signal conductors 210 and the ground conductors 220 may be arbitrary as needed. The user needs may be met in terms of both the cost and the performance, and market competitiveness of the right angle connector 610 is higher.

In some embodiments, as shown in FIG. 8, when viewed along the arrangement direction of the plurality of conductors 200, the lossy member 500 does not overlap broad sides 212 of the plurality of signal conductors 210. In this manner, the lossy member 500 may effectively avoid being electrically coupled to the plurality of signal conductors 210.

In some embodiments, a ground claw accommodating groove 102 mated to the ground claw 221 may be formed in the insulating housing 100, as shown in FIG. 5 by any suitable methods such as injection molding. The ground claw 221 may be inserted into the ground claw accommodating groove 102 to at least partially hold the ground conductor 220 in the insulating housing 100. The ground claw accommodating groove 102 may communicate with the mounting opening 101 (see FIG. 7). An accommodation space 104 may further be formed in the insulating housing 100. The lossy member 500 may be accommodated in the accommodation space 104. The accommodation space 104 may communicate with the ground claw accommodating groove 102. The lossy member 500 and the accommodation space 104 may be configured to match in shape, and the lossy member 500 may be coupled to the ground conductors 220 after being installed in the accommodation space 104.

As previously described, each signal conductor 210 may also have a signal claw 211 extending outwards. A signal claw accommodating groove 103 mated to each signal claw 211 may further be formed in the insulating housing 100, as shown in FIG. 6. An extension direction of signal claws 211 is consistent with that of the ground claws 221. Both of the signal claws 211 and the ground claws 221 may extend forward. Each signal claw 211 is inserted into the corresponding signal claw accommodating groove 103 to hold the corresponding signal conductor 210 on the insulating housing 100. The signal claw accommodating grooves 103 communicate with the mounting openings 101 (see FIG. 7). Optionally, the signal claw accommodating grooves 103 do not communicate with or spatially spaced apart from the accommodation space 104, so that the signal conductors 210 may be electrically insulated from the lossy member 500 after assembly. A distance d (see FIG. 5) from the ground claw accommodating grooves 102 to the mounting surface 120 is less than a distance D (see FIG. 6) from the signal claw accommodating grooves 103 to the mounting surface 120. That is, the bottom surfaces of the ground claw accommodating grooves 102 are lower than the bottom surfaces of the signal claw accommodating grooves 103. In this manner, there may be enough space near the mounting surface 120 to form the accommodation space 104. The accommodation space 104 may be located between the mounting surface 120 and the signal claw accommodating grooves 103.

Moreover, each ground conductor 220 may further have a projection 224, which protrudes in a direction opposite to an extension direction of the corresponding ground claw 221, as shown in FIG. 5 and FIG. 8. The projection 224 makes electrical contact with the conductive shell 400. Specifically, the projection 224 may make electrical contact with the corresponding member 420 of the conductive shell 400. In this manner, the conductive shell 400 and the lossy member 500 may make electrical contact with the ground conductors 220 on both sides thereof. Moreover, because the projections 224 and the ground claws 221 extend in opposite directions respectively, a distance between electrical contact formed between the conductive shell 400 and the ground conductors 220 and electrical contact formed between the lossy member 500 and the ground conductors 220 may be increased. The shielding effect of the conductive shell 400 and the lossy member 500 on the signal conductors 210 may be effectively improved, and the signal integrity may be improved.

Unless otherwise specified or clearly contradicted, one or more features mentioned above may be combined arbitrarily. For example, as shown in FIG. 3 and FIGS. 5-6, the conductive shell 400 may be used in combination with the lossy member 500.

Figure 11:
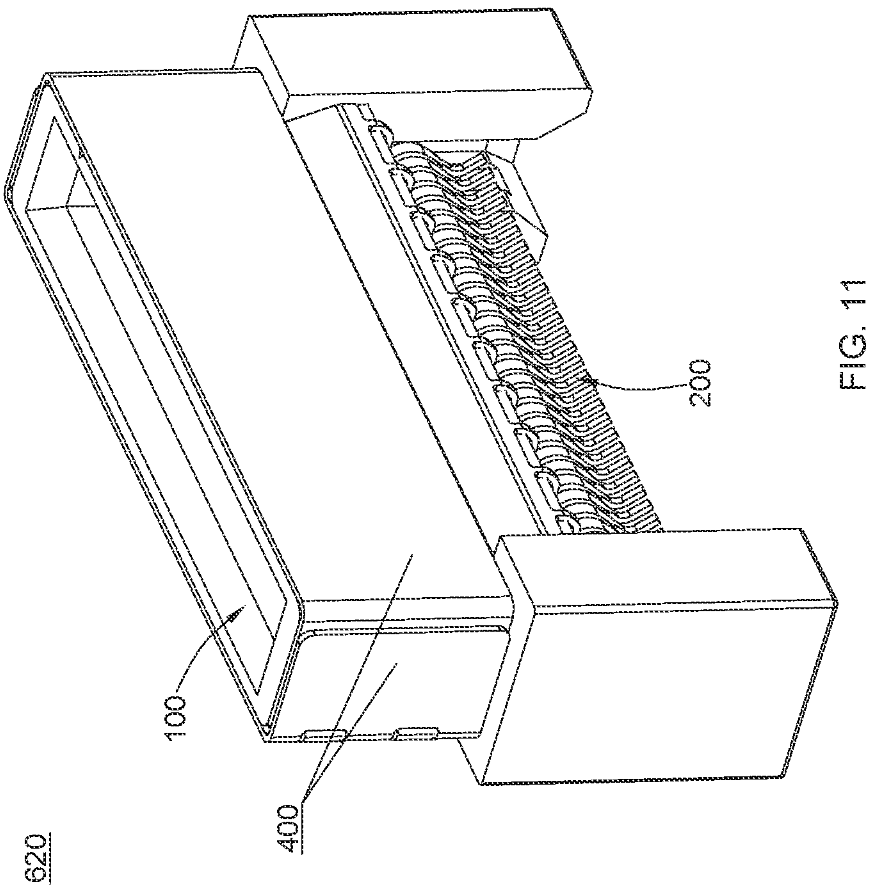
FIG. 11 is a perspective view of a straddle mount connector, according to some embodiments.
Figure 12:
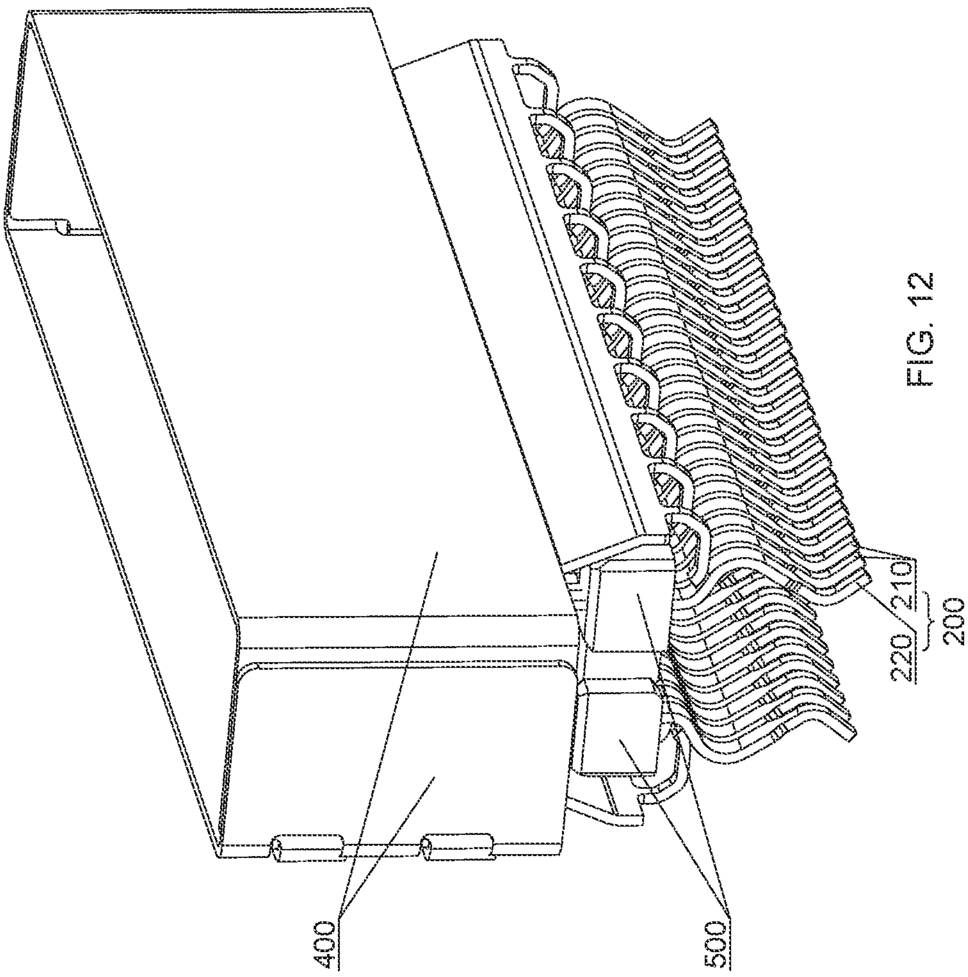
FIG. 12 is a perspective view of the straddle mount connector of FIG. 11, with an insulating housing hidden.
Figure 13:
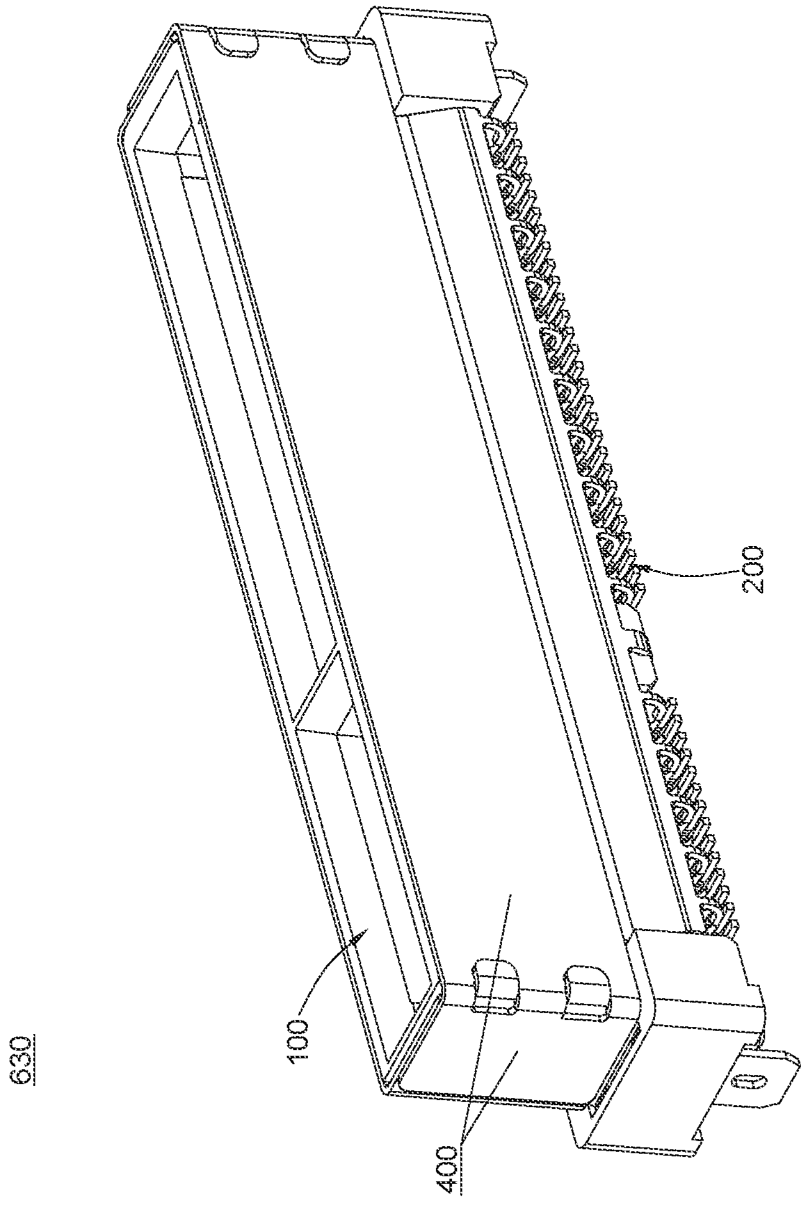
FIG. 13 is a perspective view of a vertical mount connector, according to some embodiments.
Figure 14:
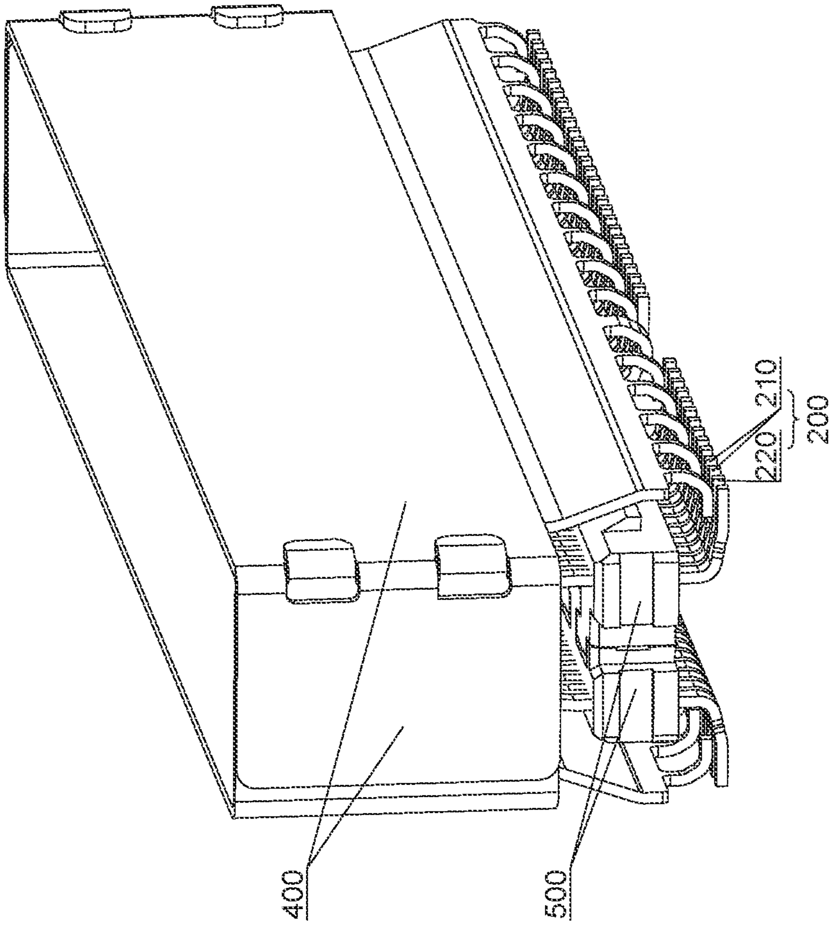
FIG. 14 is a perspective view of the vertical mount connector of FIG. 13, with an insulating housing hidden.

Various changes may be made to the structure illustrated and described herein. It should be understood that aspects of the present disclosure are not limited to the right angle connector 610. In other embodiments, the concepts disclosed herein may be widely applied to many types of electrical connectors, including but not limited to, one or more of a right angle connector 610, a straddle mount connector 620 and a vertical mount connector 630, see FIG. 11 to FIG. 13. Each of the straddle mount connectors 620 and the vertical mount connectors 630 may include a plurality of conductive shells 400. The plurality of conductive shells 400 may embrace each other to fix the insulating housing 100 therein. Optionally, each of the straddle mount connectors 620 and the vertical mount connectors 630 may further include a plurality of lossy members 500, for example, two lossy members 500. Each lossy member 500 corresponds to a row of conductors 200 and is coupled to ground conductors 220 in the corresponding row thereof. A same reference numeral is used for a same or similar part of FIG. 11 to FIG. 14, FIG. 1 to FIG. 8, FIGS. 9A-9C and FIG. 10. For simplicity, it is not described in detail herein.

The present disclosure has been described through the above embodiments, but it should be understood that the above embodiments are only for the purpose of illustration and description, and are not intended to limit the present disclosure to the scope of the described embodiments. In addition, it may be understood by a person skilled in the art that the present disclosure is not limited to the above embodiments, a variety of variations and modifications may be made according to the teaching of the present disclosure, and these variations and modifications all fall within the scope of protection of the present disclosure. The scope of protection of the present disclosure is defined by the appended claims and its equivalent scope.

In the description of the present disclosure, it is to be understood that orientation or positional relationships indicated by orientation words "front", "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words “inside” and “outside” refer to the inside and outside relative to the contour of each component itself.

Various changes may be made to the illustrative structures shown and described herein. For example, the conductive shell and the lossy member described above may be used in connection with any suitable electrical connectors, such as backplane connectors, daughter card connectors, stacking connectors, Mezzanine connectors, I/O connectors, chip sockets, Gen Z connectors, etc.

Moreover, although many creative aspects have been described above with reference to the right angle connector, it should be understood that the aspects of the present disclosure are not limited to these. Any one of the creative features, whether alone or combined with one or more other creative features, can also be used for other types of electrical connectors, such as coplanar connectors.

For facilitating description, the spatial relative terms such as “on”, “above”, “on an upper surface of” and “upper” may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component “above other components or features” or “on other components or features” will include the case where the component is “below other components or features” or “under other components or features”. Thus, the exemplary term “above” can encompass both the orientations of “above” and “below”. In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, the use of “including”, “comprising”, “having”, “containing”, or “involving”, and variations thereof herein, is meant to encompass the items listed thereafter (or equivalents thereof) and/or as additional items.

It should be noted that the terms “first”, “second” and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. An electrical connector, comprising:

a housing comprising a slot;

a plurality of conductive elements aligned in a row direction, each of the plurality of conductive elements comprising a mating end, a mounting end, and an intermediate portion joining the mating end and the mounting end, wherein the mating end comprises a mating contact portion curving into the slot of the housing, the mounting end comprises a mounting contact portion extending out of the housing, and the plurality of conductive elements comprises signal conductors and ground conductors;

a lossy member held in the housing and disposed adjacent a mounting surface of the housing, the lossy member comprising protrusions coupled to respective ground conductors; and a conductive shell at least partially enclosing the housing and exposing the slot, wherein the conductive shell is coupled to the ground conductors.

2. The electrical connector of claim 1, wherein:

the conductive shell contacts the ground conductors at respective intermediate portions and/or mounting ends.

3. The electrical connector of claim 1, wherein:

the housing comprises a top, bottom, front, rear, and two sides, the front of the housing comprises an entrance to the slot, the bottom of the housing comprises a mounting surface, and the conductive shell at least partially covers the top, rear and two sides of the housing.

4. The electrical connector of claim 3, wherein:

the rear of the housing comprises openings exposing portions of the signal conductors, and the conductive shell is spaced from the exposed portions of the signal conductors by a distance in a range of 0.2 mm to 0.5 mm.

5. The electrical connector of claim 3, wherein:

the conductive shell comprises members extending from the sides to the bottom, and the members have surfaces configured for engaging contact pads of a printed circuit board to which the electrical connector is mounted.

6. A system comprising:

the electrical connector of claim 5; and a printed circuit board, wherein the members of the conductive shell of the electrical connector are soldered to contact pads of the printed circuit board.

7. The electrical connector of claim 1, wherein:

the housing comprises a top, bottom, front, rear, and two sides, the front of the housing comprises an entrance to the slot, the rear of the housing comprises a mounting surface, and the conductive shell at least partially covers the top, bottom, and two sides of the housing.

8. The electrical connector of claim 1, wherein:

the intermediate portion of each of the plurality of conductive elements comprises a projection;

the conductive shell comprises a plurality of members; and each of the plurality of members comprises a contact portion curving towards the projection of the intermediate portion of a respective conductive element.

9. The electrical connector of claim 8, wherein:

the plurality of members are aligned in the row direction.

10. The electrical connector of claim 8, wherein:

the conductive shell comprises a plurality of holes, and the projections of the intermediate portions of the ground conductors extend through respective holes of the conductive shell.

11. The electrical connector of claim 1, wherein:

the electrical connector is configured to conform to electrical and mechanical requirements set by a peripheral component interface express (PCIe) Gen 5 standard.

12. An electrical connector, comprising:

a housing comprising a mating surface exposing a slot and a mounting surface;

a plurality of conductive elements held in the housing, each of the plurality of conductive elements comprising a mating end, a mounting end, and an intermediate portion joining the mating end and the mounting end, wherein the mating end comprises a mating contact portion curving into the slot of the housing, the mounting end comprises a mounting contact portion extending out of the housing, the intermediate portion comprises a projection towards a conductive shell, and the plurality of conductive elements comprises signal conductors and ground conductors; and the conductive shell covering one or more sides of the housing, wherein the conductive shell is coupled to the ground conductors, wherein:

the conductive shell comprises a plurality of holes; and the projections of the intermediate portions of the ground conductors extend through respective holes of the conductive shell.

13. The electrical connector of claim 12, wherein:

the conductive shell comprises a plurality of members each curving towards the projection of the intermediate portion of a respective ground conductor.

14. The electrical connector of claim 12, comprising:

a lossy member held in the housing and disposed adjacent the mounting surface of the housing, wherein, for each of the ground conductors, the intermediate portion comprises a projection towards the lossy member.

15. The electrical connector of claim 12, wherein, for each of the plurality of conductive elements:

the mating end and the mounting end extend in parallel or perpendicular to each other.

16. An electrical connector, comprising:

a housing comprising a mating surface exposing a slot and a mounting surface;

a plurality of conductive elements aligned in a row direction, each of the plurality of conductive elements comprising a mating end having a mating contact portion curving into the slot of the housing, a mounting end comprising a mounting contact portion extending out of the mounting surface of the housing, and an intermediate portion joining the mating end and the mounting end;

a conductive shell extending from the mating surface to the mounting surface, wherein a subset of the plurality of conductive elements are coupled to the conductive shell; and a lossy member held in the housing and disposed adjacent the mounting surface of the housing, wherein the lossy member comprises protrusions contacting respective ones of the subset of the plurality of conductive elements.

17. The electrical connector of claim 16, wherein:

the conductive shell contacts the subset of the plurality of conductive elements at respective intermediate portions and/or mounting end.

18. The electrical connector of claim 17, wherein:

the conductive shell comprises a plurality of members each having a contact portion contacting a respective one of the subset of the plurality of conductive elements.

19. The electrical connector of claim 17, wherein, for each of the subset of the plurality of conductive elements:

the intermediate portion comprises a projection contacting the conductive shell.

20. The electrical connector of claim 16, wherein:

the conductive shell comprises tabs extending in parallel to the mounting surface such that the tabs are configured for surface mount soldering.

* * * * *